United States Patent
Pandey

(10) Patent No.: US 8,728,389 B2
(45) Date of Patent: May 20, 2014

(54) FABRICATION OF L1$_2$ ALUMINUM ALLOY TANKS AND OTHER VESSELS BY ROLL FORMING, SPIN FORMING, AND FRICTION STIR WELDING

(75) Inventor: Awadh B. Pandey, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 1237 days.

(21) Appl. No.: 12/551,767

(22) Filed: Sep. 1, 2009

(65) Prior Publication Data
US 2011/0052932 A1 Mar. 3, 2011

(51) Int. Cl.
*B22F 1/00* (2006.01)

(52) U.S. Cl.
USPC ................ 419/31; 419/28; 419/48; 419/60; 428/598

(58) Field of Classification Search
USPC .......................................... 419/31
See application file for complete search history.

(56) References Cited

U.S. PATENT DOCUMENTS

| | | |
|---|---|---|
| 3,619,181 A | 11/1971 | Willey et al. |
| 3,816,080 A | 6/1974 | Bomford et al. |
| 4,041,123 A | 8/1977 | Lange et al. |
| 4,259,112 A | 3/1981 | Dolowy, Jr. et al. |
| 4,463,058 A | 7/1984 | Hood et al. |
| 4,469,537 A | 9/1984 | Ashton et al. |
| 4,499,048 A | 2/1985 | Hanejko |
| 4,597,792 A | 7/1986 | Webster |
| 4,626,294 A | 12/1986 | Sanders, Jr. |
| 4,647,321 A | 3/1987 | Adam |
| 4,661,172 A | 4/1987 | Skinner et al. |
| 4,667,497 A | 5/1987 | Oslin et al. |
| 4,689,090 A | 8/1987 | Sawtell et al. |
| 4,710,246 A | 12/1987 | La Caer et al. |
| 4,713,216 A | 12/1987 | Higashi et al. |
| 4,755,221 A | 7/1988 | Paliwal et al. |
| 4,832,741 A | 5/1989 | Couper |
| 4,834,810 A | 5/1989 | Benn et al. |

(Continued)

FOREIGN PATENT DOCUMENTS

| | | |
|---|---|---|
| CN | 1436870 A | 8/2003 |
| CN | 101205578 A | 6/2008 |

(Continued)

OTHER PUBLICATIONS

Cook, R., et al. "Aluminum and Aluminum Alloy Powders for P/M Applications." The Aluminum Powder Company Limited, Ceracon Inc.

(Continued)

*Primary Examiner* — Jessee Roe
*Assistant Examiner* — Christopher Kessler
(74) *Attorney, Agent, or Firm* — Kinney & Lange, P.A.

(57) ABSTRACT

A method for producing high strength aluminum alloy tanks and other vessels containing L1$_2$ dispersoids from an aluminum alloy powder containing the L1$_2$ dispersoids. The powder is consolidated into a billet having a density of about 100 percent. Tanks are formed by rolling consolidated billets into sheets, cutting preforms from said sheets, roll forming the performs into cylindrical shapes and friction stir welding the seams to form cylinders. L1$_2$ alloy domes are spin formed from the rolled sheet and friction stir welded to the cylinder. Circular bases are cut from the rolled sheet and friction stir welded to the domed cylinder to form bottoms of the tank.

8 Claims, 16 Drawing Sheets

(56) References Cited

U.S. PATENT DOCUMENTS

| | | | |
|---|---|---|---|
| 4,834,942 A | 5/1989 | Frazier et al. | |
| 4,853,178 A | 8/1989 | Oslin | |
| 4,865,806 A | 9/1989 | Skibo et al. | |
| 4,874,440 A | 10/1989 | Sawtell et al. | |
| 4,915,605 A | 4/1990 | Chan et al. | |
| 4,923,532 A | 5/1990 | Zedalis et al. | |
| 4,927,470 A | 5/1990 | Cho | |
| 4,933,140 A | 6/1990 | Oslin | |
| 4,946,517 A | 8/1990 | Cho | |
| 4,964,927 A | 10/1990 | Shiflet et al. | |
| 4,988,464 A | 1/1991 | Riley | |
| 5,032,352 A | 7/1991 | Meeks et al. | |
| 5,053,084 A | 10/1991 | Masumoto et al. | |
| 5,055,257 A | 10/1991 | Chakarabari et al. | |
| 5,059,390 A | 10/1991 | Burleigh et al. | |
| 5,066,342 A | 11/1991 | Rioja et al. | |
| 5,076,340 A | 12/1991 | Bruski et al. | |
| 5,076,865 A | 12/1991 | Hashimoto et al. | |
| 5,130,209 A | 7/1992 | Das et al. | |
| 5,133,931 A | 7/1992 | Cho | |
| 5,198,045 A | 3/1993 | Cho et al. | |
| 5,211,910 A | 5/1993 | Pickens et al. | |
| 5,226,983 A | 7/1993 | Skinner et al. | |
| 5,256,215 A | 10/1993 | Horimura | |
| 5,308,410 A | 5/1994 | Horimura et al. | |
| 5,312,494 A | 5/1994 | Horimura et al. | |
| 5,318,641 A | 6/1994 | Masumoto et al. | |
| 5,397,403 A | 3/1995 | Horimura et al. | |
| 5,458,700 A | 10/1995 | Masumoto et al. | |
| 5,462,712 A | 10/1995 | Langan et al. | |
| 5,480,470 A | 1/1996 | Miller et al. | |
| 5,532,069 A | 7/1996 | Masumoto et al. | |
| 5,597,529 A | 1/1997 | Tack | |
| 5,620,652 A | 4/1997 | Tack et al. | |
| 5,624,632 A | 4/1997 | Baumann et al. | |
| 5,882,449 A | 3/1999 | Waldron et al. | |
| 6,139,653 A | 10/2000 | Fernandes et al. | |
| 6,149,737 A | 11/2000 | Hattori et al. | |
| 6,247,634 B1 * | 6/2001 | Whitehouse | 228/112.1 |
| 6,248,453 B1 | 6/2001 | Watson | |
| 6,254,704 B1 | 7/2001 | Laul et al. | |
| 6,258,318 B1 | 7/2001 | Lenczowski et al. | |
| 6,309,594 B1 | 10/2001 | Meeks, III et al. | |
| 6,312,643 B1 | 11/2001 | Upadhya et al. | |
| 6,315,948 B1 | 11/2001 | Lenczowski et al. | |
| 6,331,218 B1 | 12/2001 | Inoue et al. | |
| 6,355,209 B1 | 3/2002 | Dilmore et al. | |
| 6,368,427 B1 | 4/2002 | Sigworth | |
| 6,506,503 B1 | 1/2003 | Mergen et al. | |
| 6,517,954 B1 | 2/2003 | Mergen et al. | |
| 6,524,410 B1 | 2/2003 | Kramer et al. | |
| 6,531,004 B1 | 3/2003 | Lenczowski et al. | |
| 6,562,154 B1 | 5/2003 | Rioja et al. | |
| 6,630,008 B1 | 10/2003 | Meeks, III et al. | |
| 6,660,106 B1 * | 12/2003 | Babel et al. | 148/527 |
| 6,702,982 B1 | 3/2004 | Chin et al. | |
| 6,902,699 B2 | 6/2005 | Fritzemeier et al. | |
| 6,918,970 B2 | 7/2005 | Lee et al. | |
| 6,974,510 B2 | 12/2005 | Watson | |
| 7,048,815 B2 | 5/2006 | Senkov et al. | |
| 7,097,807 B1 | 8/2006 | Meeks, III et al. | |
| 7,241,328 B2 | 7/2007 | Keener | |
| 7,344,675 B2 | 3/2008 | Van Daam et al. | |
| 2001/0054247 A1 | 12/2001 | Stall et al. | |
| 2003/0192627 A1 | 10/2003 | Lee et al. | |
| 2004/0046402 A1 | 3/2004 | Winardi | |
| 2004/0055671 A1 | 3/2004 | Olson et al. | |
| 2004/0089382 A1 | 5/2004 | Senkov et al. | |
| 2004/0170522 A1 | 9/2004 | Watson | |
| 2004/0191111 A1 | 9/2004 | Nie et al. | |
| 2005/0013725 A1 | 1/2005 | Hsiao | |
| 2005/0147520 A1 | 7/2005 | Canzona | |
| 2006/0011272 A1 | 1/2006 | Lin et al. | |
| 2006/0093512 A1 | 5/2006 | Pandey | |
| 2006/0172073 A1 | 8/2006 | Groza et al. | |
| 2006/0269437 A1 | 11/2006 | Pandey | |
| 2007/0048167 A1 | 3/2007 | Yano | |
| 2007/0062669 A1 | 3/2007 | Song et al. | |
| 2008/0066833 A1 | 3/2008 | Lin et al. | |

FOREIGN PATENT DOCUMENTS

| | | |
|---|---|---|
| EP | 0 208 631 A1 | 6/1986 |
| EP | 0 584 596 A2 | 3/1994 |
| EP | 1 111 079 A1 | 6/2001 |
| EP | 1 249 303 A1 | 10/2002 |
| EP | 1 170 394 B1 | 4/2004 |
| EP | 1 439 239 A1 | 7/2004 |
| EP | 1 471 157 A1 | 10/2004 |
| EP | 1 111 078 B1 | 9/2006 |
| EP | 1 728 881 A2 | 12/2006 |
| EP | 1 788 102 A1 | 5/2007 |
| EP | 2110452 A1 | 10/2009 |
| FR | 2 656 629 A1 | 12/1990 |
| FR | 2843754 A1 | 2/2004 |
| JP | 04218638 A | 8/1992 |
| JP | 9104940 A | 4/1997 |
| JP | 9279284 A | 10/1997 |
| JP | 11156584 A | 6/1999 |
| JP | 2000119786 A | 4/2000 |
| JP | 2001038442 A | 2/2001 |
| JP | 2006248372 A | 9/2006 |
| JP | 2007188878 A | 7/2007 |
| KR | 20040067608 A | 7/2004 |
| RU | 2001144 C1 | 10/1993 |
| RU | 2001145 C1 | 10/1993 |
| WO | 90 02620 A1 | 3/1990 |
| WO | 91 10755 A2 | 7/1991 |
| WO | 9111540 A1 | 8/1991 |
| WO | 9532074 A2 | 11/1995 |
| WO | WO9610099 | 4/1996 |
| WO | 9833947 A1 | 8/1998 |
| WO | 00 37696 A1 | 6/2000 |
| WO | 0112868 A1 | 2/2001 |
| WO | 02 29139 A2 | 4/2002 |
| WO | 03 052154 A1 | 6/2003 |
| WO | 03085145 A2 | 10/2003 |
| WO | 03085146 A1 | 10/2003 |
| WO | 03 104505 A2 | 12/2003 |
| WO | 2004 005562 A2 | 1/2004 |
| WO | 2004046402 A2 | 6/2004 |
| WO | 2005 045080 A1 | 5/2005 |
| WO | 2005047554 A1 | 5/2005 |

OTHER PUBLICATIONS

"Aluminum and Aluminum Alloys." ASM Specialty Handbook. 1993. ASM International. p. 559.

ASM Handbook, vol. 7 ASM International, Materials Park, OH (1993) p. 396.

Gangopadhyay, A.K., et al. "Effect of rare-earth atomic radius on the devitrification of Al88RE8Ni4 amorphous alloys." Philosophical Magazine A, 2000, vol. 80, No. 5, pp. 1193-1206.

Riddle, Y.W., et al. "Improving Recrystallization Resistance in WRought Aluminum Alloys with Scandium Addition." Lightweight Alloys for Aerospace Applications VI (pp. 26-39), 2001 TMS Annual Meeting, New Orleans, Louisiana, Feb. 11-15, 2001.

Baikowski Malakoff Inc. "The many uses of High Purity Alumina." Technical Specs. http://www.baikowskimalakoff.com/pdf/Rc-Ls.pdf (2005).

Lotsko, D.V., et al. "Effect of small additions of transition metals on the structure of Al-Zn-Mg-Zr-Sc alloys." New Level of Properties. Advances in Insect Physiology. Academic Press, vol. 2, Nov. 4, 2002. pp. 535-536.

Neikov, O.D., et al. "Properties of rapidly solidified powder aluminum alloys for elevated temperatures produced by water atomization." Advances in Powder Metallurgy & Particulate Materials. 2002. pp. 7-14-7-27.

Harada, Y. et al. "Microstructure of Al3Sc with ternary transition-metal additions." Materials Science and Engineering A329-331 (2002) 686-695.

(56) References Cited

OTHER PUBLICATIONS

Unal, A. et al. "Gas Atomization" from the section "Production of Aluminum and Aluminum-Alloy Powder" ASM Handbook, vol. 7. 2002.

Riddle, Y.W., et al. "A Study of Coarsening, Recrystallization, and Morphology of Microstructure in Al-Sc-(Zr)-(Mg) Alloys." Metallurgical and Materials Transactions A. vol. 35A, Jan. 2004. pp. 341-350.

Mil'Man, Y.V. et al. "Effect of Additional Alloying with Transition Metals on the STructure of an Al-7.1 Zn-1.3 Mg-0.12 Zr Alloy." Metallofizika I Noveishie Teknohologii, 26 (10), 1363-1378, 2004.

Tian, N. et al. "Heating rate dependence of glass transition and primary crystallization of Al88Gd6Er2Ni4 metallic glass." Scripta Materialia 53 (2005) pp. 681-685.

Litynska, L. et al. "Experimental and theoretical characterization of Al3Sc precipitates in Al-Mg-Si-Cu-Sc-Zr alloys." Zeitschrift Fur Metallkunde. vol. 97, No. 3. Jan. 1, 2006. pp. 321-324.

Rachek, O.P. "X-ray diffraction study of amorphous alloys Al-Ni-Ce-Sc with using Ehrenfest's formula." Journal of Non-Crystalline Solids 352 (2006) pp. 3781-3786.

Pandey A B et al, "High Strength Discontinuously Reinforced Aluminum for Rocket Applications," Affordable Metal Matrix Composites for High Performance Applications. Symposia Proceedings, TMS (The Minerals, Metals & Materials Society), US, No. 2nd, Jan. 1, 2008, pp. 3-12.

Niu, Ben et al. "Influence of addition of 1-15 erbium on microstructure and crystallization behavior of Al-Ni-Y amorphous alloy" Zhongguo Xitu Xuebao, 26(4), pp. 450-454. 2008.

Riddle, Y.W., et al. "Recrystallization Performance of AA7050 Varied with Sc and Zr." Materials Science Forum. 2000. pp. 799-804.

Lotsko, D.V., et al. "High-strength aluminum-based alloys hardened by quasicrystalline nanoparticles." Science for Materials in the Frontier of Centuries: Advantages and Challenges, International Conference: Kyiv, Ukraine. Nov. 4-8, 2002. vol. 2. pp. 371-372.

Hardness Conversion Table. Downloaded from http://www.gordonengland.co.uk/hardness/hardness_conversion_2m.htm.

Cabbibo, M. et al., "A TEM study of the combined effect of severe plastic deformation and (Zr), (Sc+Zr)-containing dispersoids on an Al-Mg-Si alloy." Journal of Materials Science, vol. 41, Nol. 16, Jun. 6, 2006. pp. 5329-5338.

Litynska-Dobrzynska, L. "Effect of heat treatment on the sequence of phases formation in Al-Mg-Si alloy with Sc and Zr additions." Archives of Metallurgy and Materials. 51 (4), pp. 555-560, 2006.

Litynska-Dobrzynska, L. "Precipitation of Phases in Al-Mg-Si-Cu Alloy with Sc and Zr and Zr Additions During Heat Treatment" Diffusion and Defect Data, Solid State Data, Part B, Solid Statephenomena. vol. 130, No. Applied Crystallography, Jan. 1, 2007. pp. 163-166.

\* cited by examiner

FABRICATION OF L1$_2$ ALUMINUM ALLOY TANKS AND OTHER VESSELS BY ROLL FORMING, SPIN FORMING, AND FRICTION STIR WELDING

CROSS-REFERENCE TO RELATED APPLICATION(S)

This application is related to the following co-pending applications that were filed on Dec. 9, 2008 herewith and are assigned to the same assignee: CONVERSION PROCESS FOR HEAT TREATABLE L1$_2$ ALUMINUM ALLOYS, Ser. No. 12/316,020; A METHOD FOR FORMING HIGH STRENGTH ALUMINUM ALLOYS CONTAINING L1$_2$ INTERMETALLIC DISPERSOIDS, Ser. No. 12/316,046; and A METHOD FOR PRODUCING HIGH STRENGTH ALUMINUM ALLOY POWDER CONTAINING L1$_2$ INTERMETALLIC DISPERSOIDS, Ser. No. 12/316,047.

This application is also related to the following co-pending applications that were filed on Apr. 18, 2008, and are assigned to the same assignee: L1$_2$ ALUMINUM ALLOYS WITH BIMODAL AND TRIMODAL DISTRIBUTION, U.S. Pat. No. 8,409,373, Ser. No. 12/148,395; DISPERSION STRENGTHENED L1$_2$ ALUMINUM ALLOYS, U.S. Pat. No. 8,017,072, Ser. No. 12/148,432; HEAT TREATABLE L1$_2$ ALUMINUM ALLOYS, ABANDONED Ser. No. 12/148,383; HIGH STRENGTH L1$_2$ ALUMINUM ALLOYS, U.S. Pat. No. 7,871,477, Ser. No. 12/148,394; HIGH STRENGTH L1$_2$ ALUMINUM ALLOYS, U.S. Pat. No. 811,395, Ser. No. 12/148,382; HEAT TREATABLE L1$_2$ ALUMINUM ALLOYS, U.S. Pat. No. 7,875,133, Ser. No. 12/148,396; HIGH STRENGTH L1$_2$ ALUMINUM ALLOYS, US20090263273A1, Ser. No. 12/148,387; HIGH STRENGTH ALUMINUM ALLOYS WITH L1$_2$ PRECIPITATES, U.S. Pat. No. 7,879,162, Ser. No. 12/148,426; HIGH STRENGTH L1$_2$ ALUMINUM ALLOYS, U.S. Pat. No. 8,002,912, Ser. No. 12/148,459; and L1$_2$ STRENGTHENED AMORPHOUS ALUMINUM ALLOYS, U.S. Pat. No. 7,875,131, Ser. No. 12/148,458.

BACKGROUND

The present invention relates generally to aluminum alloys and more specifically to a method for forming high strength aluminum alloy powder having L1$_2$ dispersoids therein into aluminum parts such as tanks, containers and other components of turbine engines as well as other products fabricated from aluminum alloys.

The combination of high strength, ductility, and fracture toughness, as well as low density, make aluminum alloys natural candidates for as variety of applications. Because of its low weight high strength, ductility and fracture toughness, aluminum alloys are of interest in the manufacture and use for many applications.

The development of aluminum alloys with improved elevated temperature mechanical properties is a continuing process. Some attempts have included aluminum-iron and aluminum-chromium based alloys such as Al—Fe—Ce, Al—Fe—V—Si, Al—Fe—Ce—W, and Al—Cr—Zr—Mn that contain incoherent dispersoids. These alloys, however, also lose strength at elevated temperatures due to particle coarsening. In addition, these alloys exhibit ductility and fracture toughness values lower than other commercially available aluminum alloys.

Other attempts have included the development of mechanically alloyed Al—Mg and Al—Ti alloys containing ceramic dispersoids. These alloys exhibit improved high temperature strength due to the particle dispersion, but the ductility and fracture toughness are not improved.

U.S. Pat. No. 6,248,453 discloses aluminum alloys strengthened by dispersed Al$_3$X L1$_2$ intermetallic phases where X is selected from the group consisting of Sc, Er, Lu, Yb, Tm, and Lu. The Al$_3$X particles are coherent with the aluminum alloy matrix and are resistant to coarsening at elevated temperatures. The improved mechanical properties of the disclosed dispersion strengthened L1$_2$ aluminum alloys are stable up to 572° F. (300° C.). U.S. Patent Application Publication No. 2006/0269437 A1 discloses a high strength aluminum alloy that contains scandium and other elements that is strengthened by L1$_2$ dispersoids.

L1$_2$ strengthened aluminum alloys have high strength and improved fatigue properties compared to commercial aluminum alloys. Fine grain size results in improved mechanical properties of materials. Hall-Petch strengthening has been known for decades where strength increases as grain size decreases. An optimum grain size for optimum strength is in the nano range of about 30 to 100 nm. These alloys also have higher ductility.

SUMMARY

The present invention is a method for consolidating aluminum alloy powders into useful components such as tanks and other vessels having improved strength and fracture toughness. In embodiments, powders include an aluminum alloy having coherent L1$_2$ Al$_3$X dispersoids where X is at least one first element selected from scandium, erbium, thulium, ytterbium, and lutetium, and at least one second element selected from gadolinium, yttrium, zirconium, titanium, hafnium, and niobium. The balance is substantially aluminum containing at least one alloying element selected from silicon, magnesium, manganese, lithium, copper, zinc, and nickel.

In one embodiment the L1$_2$ aluminum alloy tanks and other vessels are formed by rolling consolidated billets into sheets, cutting preforms from said sheets, roll forming the preforms into a cylindrical shape and friction stir welding the seam to form a cylinder. A spin formed L1$_2$ alloy dome and a flat bottom are then friction stir welded to the cylinder to form a tank.

DETAILED DESCRIPTION

1. $L1_2$ Aluminum Alloys

Figure 1:
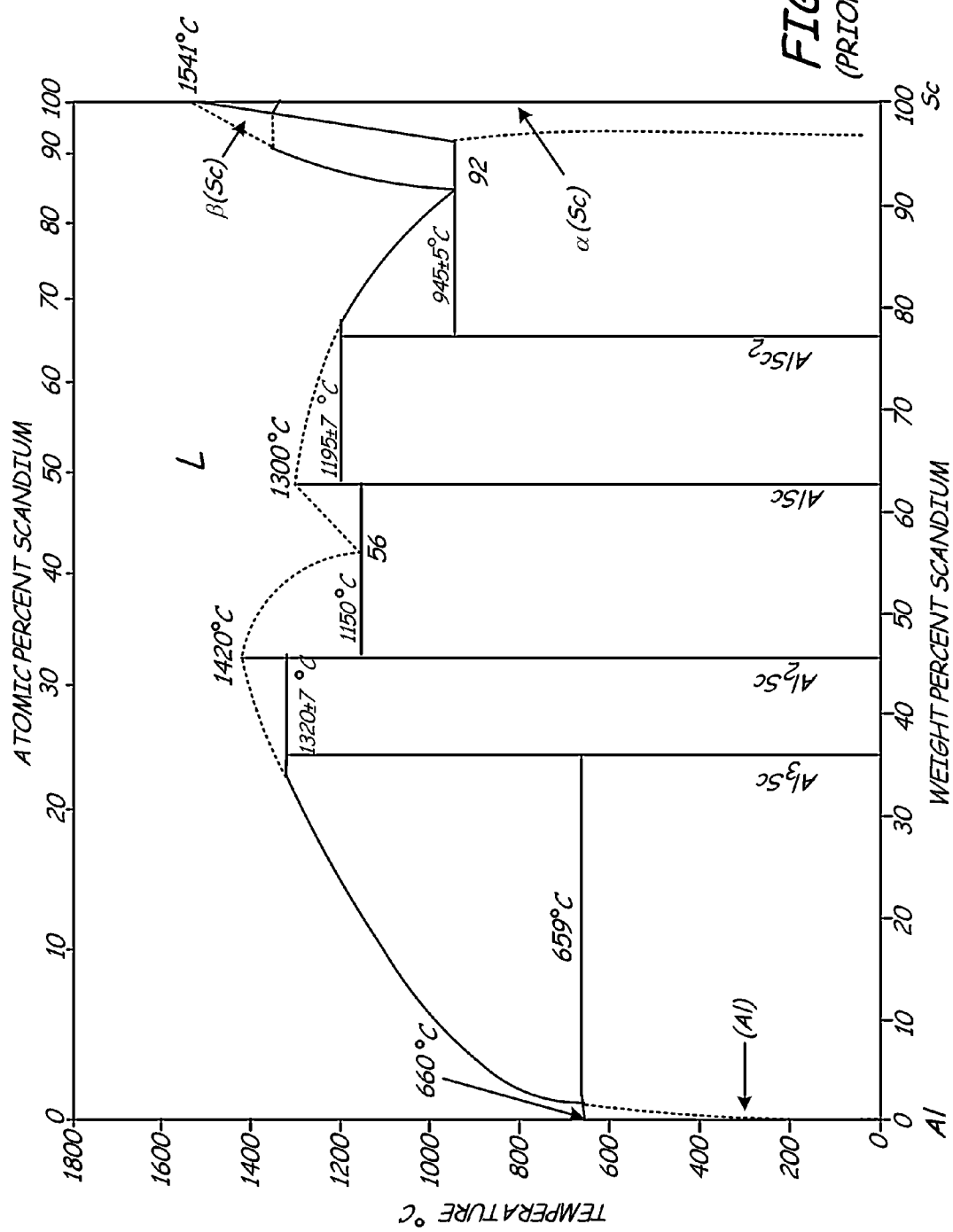
FIG. 1 is an aluminum scandium phase diagram.

Alloy powders of this invention are formed from aluminum based alloys with high strength and fracture toughness for applications at temperatures from about −420° F. (−251° C.) up to about 650° F. (343° C.). The aluminum alloy comprises a solid solution of aluminum and at least one element selected from silicon, magnesium, lithium, copper, zinc, and nickel strengthened by $L1_2$ $Al_3X$ coherent precipitates where X is at least one first element selected from scandium, erbium, thulium, ytterbium, and lutetium, and at least one second element selected from gadolinium, yttrium, zirconium, titanium, hafnium, and niobium.

The alloys may also include at least one ceramic reinforcement. Aluminum oxide, silicon carbide, aluminum nitride, titanium diboride, titanium boride, boron carbide and titanium carbide are suitable ceramic reinforcements.

The binary aluminum magnesium system is a simple eutectic at 36 weight percent magnesium and 842° F. (450° C.). There is complete solubility of magnesium and aluminum in the rapidly solidified inventive alloys discussed herein The binary aluminum lithium system is a simple eutectic at 8 weight percent lithium and 1105° (596° C.). The equilibrium solubility of 4 weight percent lithium can be extended significantly by rapid solidification techniques. There is complete solubility of lithium in the rapid solidified inventive alloys discussed herein.

The binary aluminum copper system is a simple eutectic at 32 weight percent copper and 1018° F. (548° C.). There is complete solubility of copper in the rapidly solidified inventive alloys discussed herein.

The aluminum zinc binary system is a eutectic alloy system involving a monotectoid reaction and a miscibility gap in the solid state. There is a eutectic reaction at 94 weight percent zinc and 718° F. (381° C.). Zinc has maximum solid solubility of 83.1 weight percent in aluminum at 717.8° F. (381° C.), which can be extended by rapid solidification processes. Decomposition of the supersaturated solid solution of zinc in aluminum gives rise to spherical and ellipsoidal GP zones, which are coherent with the matrix and act to strengthen the alloy.

The aluminum nickel binary system is a simple eutectic at 5.7 weight percent nickel and 1183.8° F. (639.9° C.). There is little solubility of nickel in aluminum. However, the solubility can be extended significantly by utilizing rapid solidification processes. The equilibrium phase in the aluminum nickel eutectic system is $L1_2$ intermetallic $Al_3Ni$.

In the aluminum based alloys disclosed herein, scandium, erbium, thulium, ytterbium, and lutetium are potent strengtheners that have low diffusivity and low solubility in aluminum. All these elements form equilibrium $Al_3X$ intermetallic dispersoids where X is at least one of scandium, erbium, thulium, ytterbium, and lutetium, that have an $L1_2$ structure that is an ordered face centered cubic structure with the X atoms located at the corners and aluminum atoms located on the cube faces of the unit cell.

Scandium forms $Al_3Sc$ dispersoids that are fine and coherent with the aluminum matrix. Lattice parameters of aluminum and $Al_3Sc$ are very close (0.405 nm and 0.410 nm respectively), indicating that there is minimal or no driving force for causing growth of the $Al_3Sc$ dispersoids. This low interfacial energy makes the $Al_3Sc$ dispersoids thermally stable and resistant to coarsening up to temperatures as high as about 842° F. (450° C.). Additions of magnesium in aluminum increase the lattice parameter of the aluminum matrix, and decrease the lattice parameter mismatch further increasing the resistance of the $Al_3Sc$ to coarsening. Additions of zinc, copper, lithium, silicon, manganese and nickel provide solid solution and precipitation strengthening in the aluminum alloys. These $Al_3Sc$ dispersoids are made stronger and more resistant to coarsening at elevated temperatures by adding suitable alloying elements such as gadolinium, yttrium, zirconium, titanium, hafnium, niobium, or combinations thereof, that enter $Al_3Sc$ in solution.

Erbium forms $Al_3Er$ dispersoids in the aluminum matrix that are fine and coherent with the aluminum matrix. The lattice parameters of aluminum and $Al_3Er$ are close (0.405 nm and 0.417 nm respectively), indicating there is minimal driving force for causing growth of the $Al_3Er$ dispersoids. This low interfacial energy makes the $Al_3Er$ dispersoids thermally stable and resistant to coarsening up to temperatures as high as about 842° F. (450° C.). Additions of magnesium in aluminum increase the lattice parameter of the aluminum matrix, and decrease the lattice parameter mismatch further increasing the resistance of the $Al_3Er$ to coarsening. Additions of zinc, copper, lithium, silicon, manganese and nickel provide solid solution and precipitation strengthening in the aluminum alloys. These $Al_3Er$ dispersoids are made stronger and more resistant to coarsening at elevated temperatures by adding suitable alloying elements such as gadolinium, yttrium, zirconium, titanium, hafnium, niobium, or combinations thereof that enter $Al_3Er$ in solution.

Thulium forms metastable $Al_3Tm$ dispersoids in the aluminum matrix that are fine and coherent with the aluminum matrix. The lattice parameters of aluminum and $Al_3Tm$ are close (0.405 nm and 0.420 nm respectively), indicating there is minimal driving force for causing growth of the $Al_3Tm$ dispersoids. This low interfacial energy makes the $Al_3Tm$ dispersoids thermally stable and resistant to coarsening up to temperatures as high as about 842° F. (450° C.). Additions of magnesium in aluminum increase the lattice parameter of the aluminum matrix, and decrease the lattice parameter mismatch further increasing the resistance of the $Al_3Tm$ to coarsening. Additions of zinc, copper, lithium, silicon, manganese and nickel provide solid solution and precipitation strengthening in the aluminum alloys. These $Al_3Tm$ dispersoids are made stronger and more resistant to coarsening at elevated temperatures by adding suitable alloying elements such as gadolinium, yttrium, zirconium, titanium, hafnium, niobium, or combinations thereof that enter $Al_3Tm$ in solution.

Ytterbium forms $Al_3Yb$ dispersoids in the aluminum matrix that are fine and coherent with the aluminum matrix. The lattice parameters of Al and $Al_3Yb$ are close (0.405 nm and 0.420 nm respectively), indicating there is minimal driving force for causing growth of the $Al_3Yb$ dispersoids. This low interfacial energy makes the $Al_3Yb$ dispersoids thermally stable and resistant to coarsening up to temperatures as high as about 842° F. (450° C.). Additions of magnesium in aluminum increase the lattice parameter of the aluminum matrix, and decrease the lattice parameter mismatch further increasing the resistance of the $Al_3Yb$ to coarsening. Additions of zinc, copper, lithium, silicon, manganese and nickel provide solid solution and precipitation strengthening in the aluminum alloys. These $Al_3Yb$ dispersoids are made stronger and more resistant to coarsening at elevated temperatures by adding suitable alloying elements such as gadolinium, yttrium, zirconium, titanium, hafnium, niobium, or combinations thereof that enter $Al_3Yb$ in solution.

Lutetium forms $Al_3Lu$ dispersoids in the aluminum matrix that are fine and coherent with the aluminum matrix. The lattice parameters of Al and $Al_3Lu$ are close (0.405 nm and 0.419 nm respectively), indicating there is minimal driving force for causing growth of the $Al_3Lu$ dispersoids. This low interfacial energy makes the $Al_3Lu$ dispersoids thermally stable and resistant to coarsening up to temperatures as high as about 842° F. (450° C.). Additions of magnesium in aluminum increase the lattice parameter of the aluminum matrix, and decrease the lattice parameter mismatch further increasing the resistance of the $Al_3Lu$ to coarsening. Additions of zinc, copper, lithium, silicon, manganese and nickel provide solid solution and precipitation strengthening in the aluminum alloys. These $Al_3Lu$ dispersoids are made stronger and more resistant to coarsening at elevated temperatures by adding suitable alloying elements such as gadolinium, yttrium, zirconium, titanium, hafnium, niobium, or mixtures thereof that enter $Al_3Lu$ in solution.

Gadolinium forms metastable $Al_3Gd$ dispersoids in the aluminum matrix that are stable up to temperatures as high as about 842° F. (450° C.) due to their low diffusivity in aluminum. The $Al_3Gd$ dispersoids have a $D0_{19}$ structure in the equilibrium condition. Despite its large atomic size, gadolinium has fairly high solubility in the $Al_3X$ intermetallic dispersoids (where X is scandium, erbium, thulium, ytterbium or lutetium). Gadolinium can substitute for the X atoms in $Al_3X$ intermetallic, thereby forming an ordered $L1_2$ phase which results in improved thermal and structural stability.

Yttrium forms metastable $Al_3Y$ dispersoids in the aluminum matrix that have an $L1_2$ structure in the metastable condition and a $D0_{19}$ structure in the equilibrium condition. The metastable $Al_3Y$ dispersoids have a low diffusion coefficient, which makes them thermally stable and highly resistant to coarsening. Yttrium has a high solubility in the $Al_3X$ intermetallic dispersoids allowing large amounts of yttrium to substitute for X in the $Al_3X$ $L1_2$ dispersoids, which results in improved thermal and structural stability.

Zirconium forms $Al_3Zr$ dispersoids in the aluminum matrix that have an $L1_2$ structure in the metastable condition and $D0_{23}$ structure in the equilibrium condition. The metastable $Al_3Zr$ dispersoids have a low diffusion coefficient, which makes them thermally stable and highly resistant to coarsening. Zirconium has a high solubility in the $Al_3X$ dispersoids allowing large amounts of zirconium to substitute for X in the $Al_3X$ dispersoids, which results in improved thermal and structural stability.

Titanium forms $Al_3Ti$ dispersoids in the aluminum matrix that have an $L1_2$ structure in the metastable condition and $D0_{22}$ structure in the equilibrium condition. The metastable $Al_3Ti$ despersoids have a low diffusion coefficient, which makes them thermally stable and highly resistant to coarsening. Titanium has a high solubility in the $Al_3X$ dispersoids allowing large amounts of titanium to substitute for X in the $Al_3X$ dispersoids, which result in improved thermal and structural stability.

Hafnium forms metastable $Al_3Hf$ dispersoids in the aluminum matrix that have an $L1_2$ structure in the metastable condition and a $D0_{23}$ structure in the equilibrium condition. The $Al_3Hf$ dispersoids have a low diffusion coefficient, which makes them thermally stable and highly resistant to coarsening. Hafnium has a high solubility in the $Al_3X$ dispersoids allowing large amounts of hafnium to substitute for scandium, erbium, thulium, ytterbium, and lutetium in the above-mentioned $Al_3X$ dispersoids, which results in stronger and more thermally stable dispersoids.

Niobium forms metastable $Al_3Nb$ dispersoids in the aluminum matrix that have an $L1_2$ structure in the metastable condition and a $D0_{22}$ structure in the equilibrium condition. Niobium has a lower solubility in the $Al_3X$ dispersoids than hafnium or yttrium, allowing relatively lower amounts of niobium than hafnium or yttrium to substitute for X in the $Al_3X$ dispersoids. Nonetheless, niobium can be very effective in slowing down the coarsening kinetics of the $Al_3X$ dispersoids because the $Al_3Nb$ dispersoids are thermally stable. The substitution of niobium for X in the above mentioned $Al_3X$ dispersoids results in stronger and more thermally stable dispersoids.

The aluminum oxide, silicon carbide, aluminum nitride, titanium di-boride, titanium boride, boron carbide and titanium carbide locate at the grain boundary and within the grain boundary to restrict dislocations from going around particles of the ceramic particles when the alloy is under stress. When dislocations form, they become attached with the ceramic particles on the departure side. Thus, more energy is required to detach the dislocation and the alloy has increased strength. To accomplish this, the particles of ceramic have to have a fine size, a moderate volume fraction in the alloy, and form a good interface between the matrix and the reinforcement. A working range of particle sizes is from about 0.5 to about 50 microns, more preferably about 1 to about 20 microns, and even more preferably about 1 to about 10 microns. The ceramic particles can break during blending and the average particle size will decrease as a result.

$Al_3X$ $L1_2$ precipitates improve elevated temperature mechanical properties in aluminum alloys for two reasons. First, the precipitates are ordered intermetallic compounds. As a result, when the particles are sheared by glide dislocations during deformation, the dislocations separate into two partial dislocations separated by an anti-phase boundary on the glide plane. The energy to create the anti-phase boundary is the origin of the strengthening. Second, the cubic $L1_2$ crystal structure and lattice parameter of the precipitates are closely matched to the aluminum solid solution matrix. This results in a lattice coherency at the precipitate/matrix boundary that resists coarsening. The lack of an interphase boundary results in a low driving force for particle growth and resulting elevated temperature stability. Alloying elements in solid solution in the dispersed strengthening particles and in the aluminum matrix that tend to decrease the lattice mismatch between the matrix and particles will tend to increase the strengthening and elevated temperature stability of the alloy.

$L1_2$ phase strengthened aluminum alloys are important structural materials because of their excellent mechanical properties and the stability of these properties at elevated temperature due to the resistance of the coherent dispersoids in the microstructure to particle coarsening. The mechanical properties are optimized by maintaining a high volume fraction of $L1_2$ dispersoids in the microstructure. The $L1_2$ dispersoid concentration following aging scales as the amount of $L1_2$ phase forming elements in solid solution in the aluminum alloy following quenching. Examples of $L1_2$ phase forming elements include but are not limited to Sc, Er, Th, Yb, and Lu. The concentration of alloying elements in solid solution in alloys cooled from the melt is directly proportional to the cooling rate.

Exemplary aluminum alloys for this invention include, but are not limited to (in weight percent unless otherwise specified):

about Al-M-(0.1-4)Sc-(0.1-20)Gd;
about Al-M-(0.1-20)Er-(0.1-20)Gd;
about Al-M-(0.1-15)Tm-(0.1-20)Gd;

about Al-M-(0.1-25)Yb-(0.1-20)Gd;
about Al-M-(0.1-25)Lu-(0.1-20)Gd;
about Al-M-(0.1-4)Sc-(0.1-20)Y;
about Al-M-(0.1-20)Er-(0.1-20)Y;
about Al-M-(0.1-15)Tm-(0.1-20)Y;
about Al-M-(0.1-25)Yb-(0.1-20)Y;
about Al-M-(0.1-25)Lu-(0.1-20)Y;
about Al-M-(0.1-4)Sc-(0.05-4)Zr;
about Al-M-(0.1-20)Er-(0.05-4)Zr;
about Al-M-(0.1-15)Tm-(0.05-4)Zr;
about Al-M-(0.1-25)Yb-(0.05-4)Zr;
about Al-M-(0.1-25)Lu-(0.05-4)Zr;
about Al-M-(0.1-4)Sc-(0.05-10)Ti;
about Al-M-(0.1-20)Er-(0.05-10)Ti;
about Al-M-(0.1-15)Tm-(0.05-10)Ti;
about Al-M-(0.1-25)Yb-(0.05-10)Ti;
about Al-M-(0.1-25)Lu-(0.05-10)Ti;
about Al-M-(0.1-4)Sc-(0.05-10)Hf;
about Al-M-(0.1-20)Er-(0.05-10)Hf;
about Al-M-(0.1-15)Tm-(0.05-10)Hf;
about Al-M-(0.1-25)Yb-(0.05-10)Hf;
about Al-M-(0.1-25)Lu-(0.05-10)Hf;
about Al-M-(0.1-4)Sc-(0.05-5)Nb;
about Al-M-(0.1-20)Er-(0.05-5)Nb;
about Al-M-(0.1-15)Tm-(0.05-5)Nb;
about Al-M-(0.1-25)Yb-(0.05-5)Nb; and
about Al-M-(0.1-25)Lu-(0.05-5)Nb.

M is at least one of about (1-8) weight percent magnesium, about (4-25) weight percent silicon, about (0.1-3) weight percent manganese, about (0.5-3) weight percent lithium, about (0.2-6) weight percent copper, about (3-12) weight percent zinc, and about (1-12) weight percent nickel.

The amount of magnesium present in the fine grain matrix, if any, may vary from about 1 to about 8 weight percent, more preferably from about 3 to about 7.5 weight percent, and even more preferably from about 4 to about 6.5 weight percent.

The binary aluminum silicon system is a simple eutectic at 12.6 weight percent silicon and 1070.6° F. (577° C.). There is complete solubility of silicon and aluminum in the rapidly solidified inventive alloys discussed herein The binary aluminum manganese system is a simple eutectic at about 2 weight percent manganese and 1216.4° F. (658° C.). There is complete solubility of manganese and aluminum in the rapidly solidified inventive alloys discussed herein The amount of lithium present in the fine grain matrix, if any, may vary from about 0.5 to about 3 weight percent, more preferably from about 1 to about 2.5 weight percent, and even more preferably from about 1 to about 2 weight percent.

The amount of copper present in the fine grain matrix, if any, may vary from about 0.2 to about 6 weight percent, more preferably from about 0.5 to about 5 weight percent, and even more preferably from about 2 to about 4.5 weight percent.

The amount of zinc present in the fine grain matrix, if any, may vary from about 3 to about 12 weight percent, more preferably from about 4 to about 10 weight percent, and even more preferably from about 5 to about 9 weight percent.

The amount of nickel present in the fine grain matrix, if any, may vary from about 1 to about 12 weight percent, more preferably from about 2 to about 10 weight percent, and even more preferably from about 4 to about 10 weight percent.

The amount of scandium present in the fine grain matrix, if any, may vary from 0.1 to about 4 weight percent, more preferably from about 0.1 to about 3 weight percent, and even more preferably from about 0.2 to about 2.5 weight percent. The Al—Sc phase diagram shown in FIG. 1 indicates a eutectic reaction at about 0.5 weight percent scandium at about 1219° F. (659° C.) resulting in a solid solution of scandium and aluminum and Al$_3$Sc dispersoids. Aluminum alloys with less than 0.5 weight percent scandium can be quenched from the melt to retain scandium in solid solution that may precipitate as dispersed L1$_2$ intermetallic Al$_3$Sc following an aging treatment. Alloys with scandium in excess of the eutectic composition (hypereutectic alloys) can only retain scandium in solid solution by rapid solidification processing (RSP) where cooling rates are in excess of about $10^{3°}$ C./second.

Figure 2:
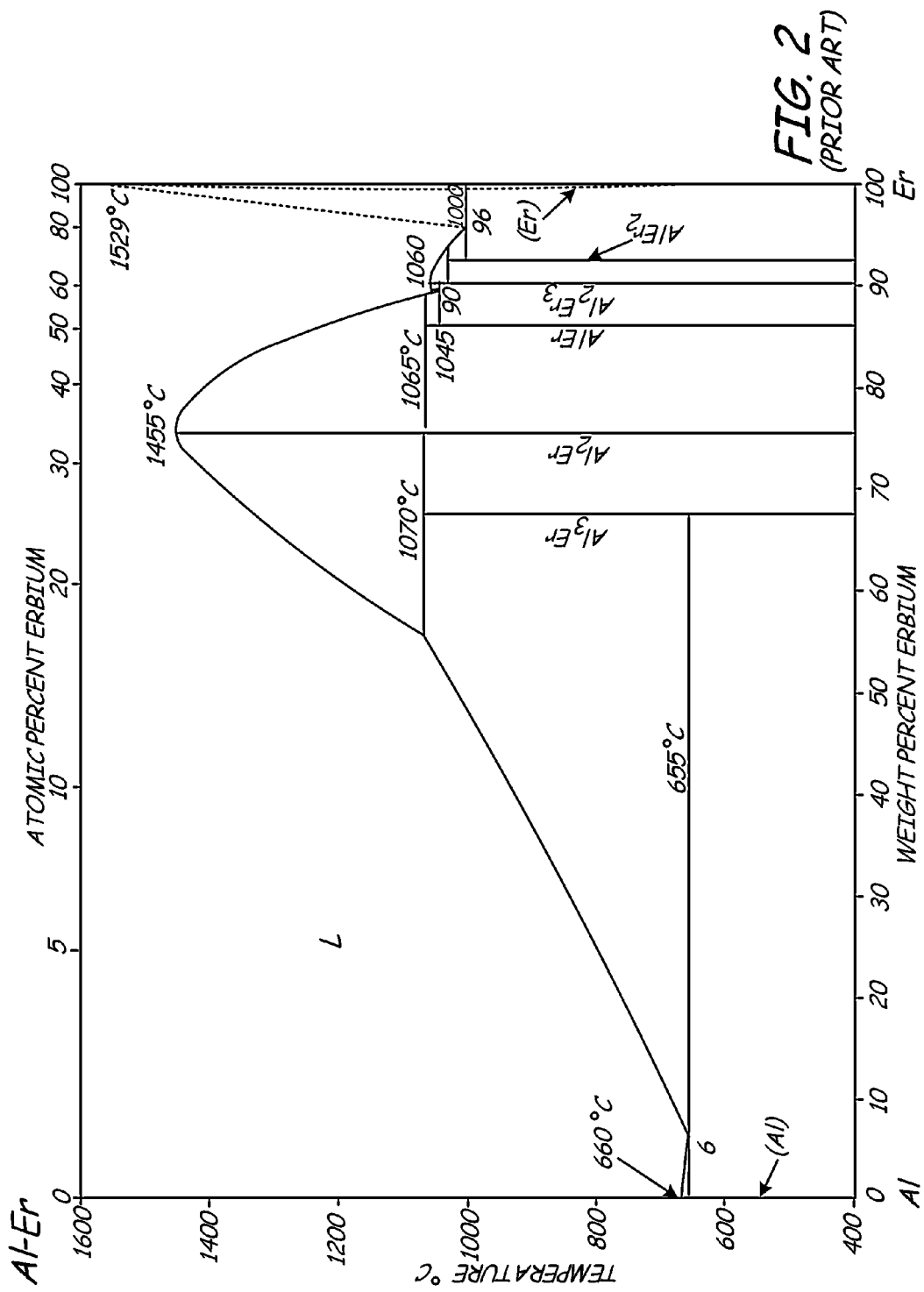
FIG. 2 is an aluminum erbium phase diagram.

The amount of erbium present in the fine grain matrix, if any, may vary from about 0.1 to about 20 weight percent, more preferably from about 0.3 to about 15 weight percent, and even more preferably from about 0.5 to about 10 weight percent. The Al—Er phase diagram shown in FIG. 2 indicates a eutectic reaction at about 6 weight percent erbium at about 1211° F. (655° C.). Aluminum alloys with less than about 6 weight percent erbium can be quenched from the melt to retain erbium in solid solutions that may precipitate as dispersed L1$_2$ intermetallic Al$_3$Er following an aging treatment. Alloys with erbium in excess of the eutectic composition can only retain erbium in solid solution by rapid solidification processing (RSP) where cooling rates are in excess of about 10$^3$° C./second.

Figure 3:
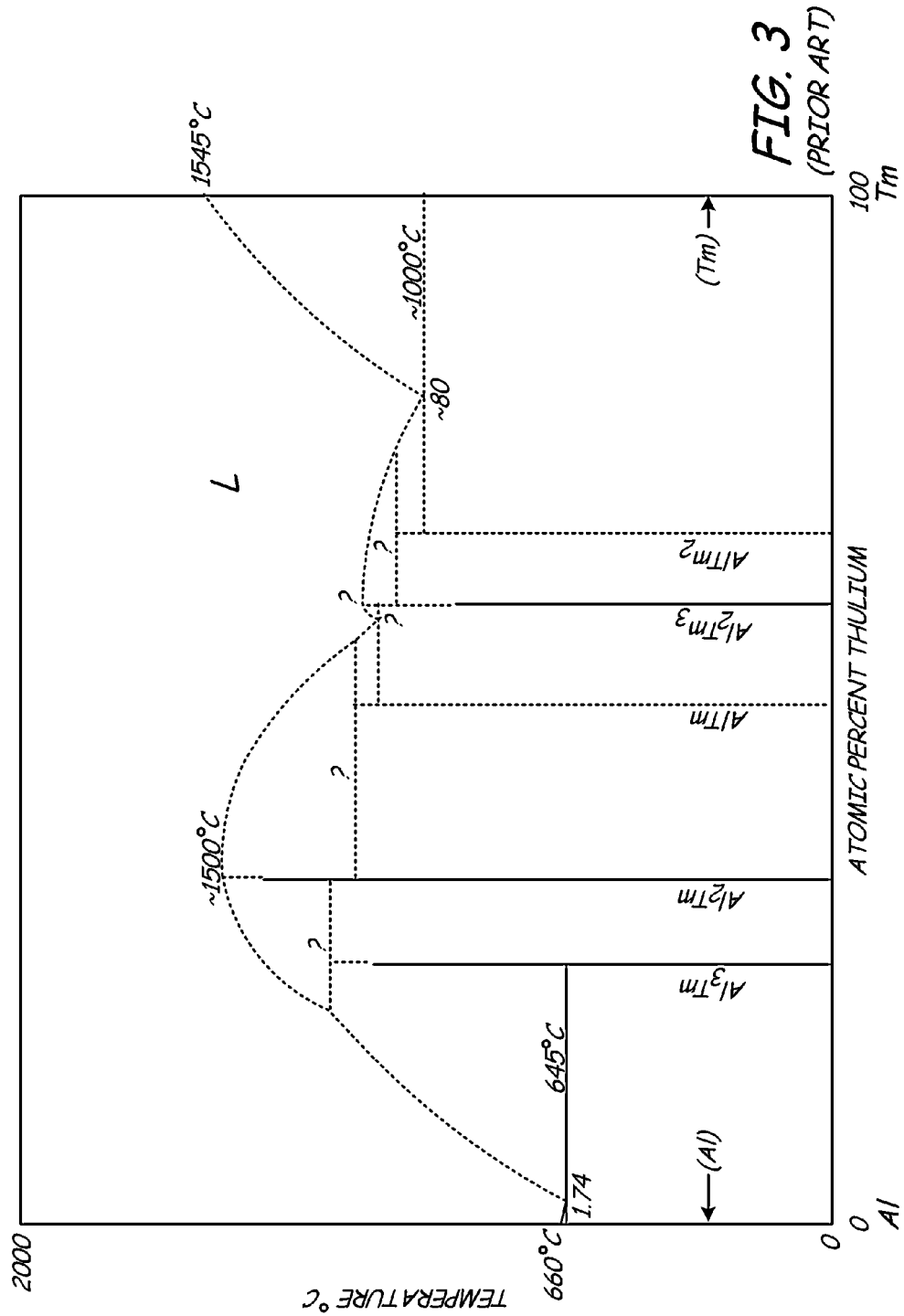
FIG. 3 is an aluminum thulium phase diagram.

The amount of thulium present in the alloys, if any, may vary from about 0.1 to about 15 weight percent, more preferably from about 0.2 to about 10 weight percent, and even more preferably from about 0.4 to about 6 weight percent. The Al—Tm phase diagram shown in FIG. 3 indicates a eutectic reaction at about 10 weight percent thulium at about 1193° F. (645° C.). Thulium forms metastable Al$_3$Tm dispersoids in the aluminum matrix that have an L1$_2$ structure in the equilibrium condition. The Al$_3$Tm dispersoids have a low diffusion coefficient, which makes them thermally stable and highly resistant to coarsening. Aluminum alloys with less than 10 weight percent thulium can be quenched from the melt to retain thulium in solid solution that may precipitate as dispersed metastable L1$_2$ intermetallic Al$_3$Tm following an aging treatment. Alloys with thulium in excess of the eutectic composition can only retain Tm in solid solution by rapid solidification processing (RSP) where cooling rates are in excess of about 10$^3$° C./second.

Figure 4:
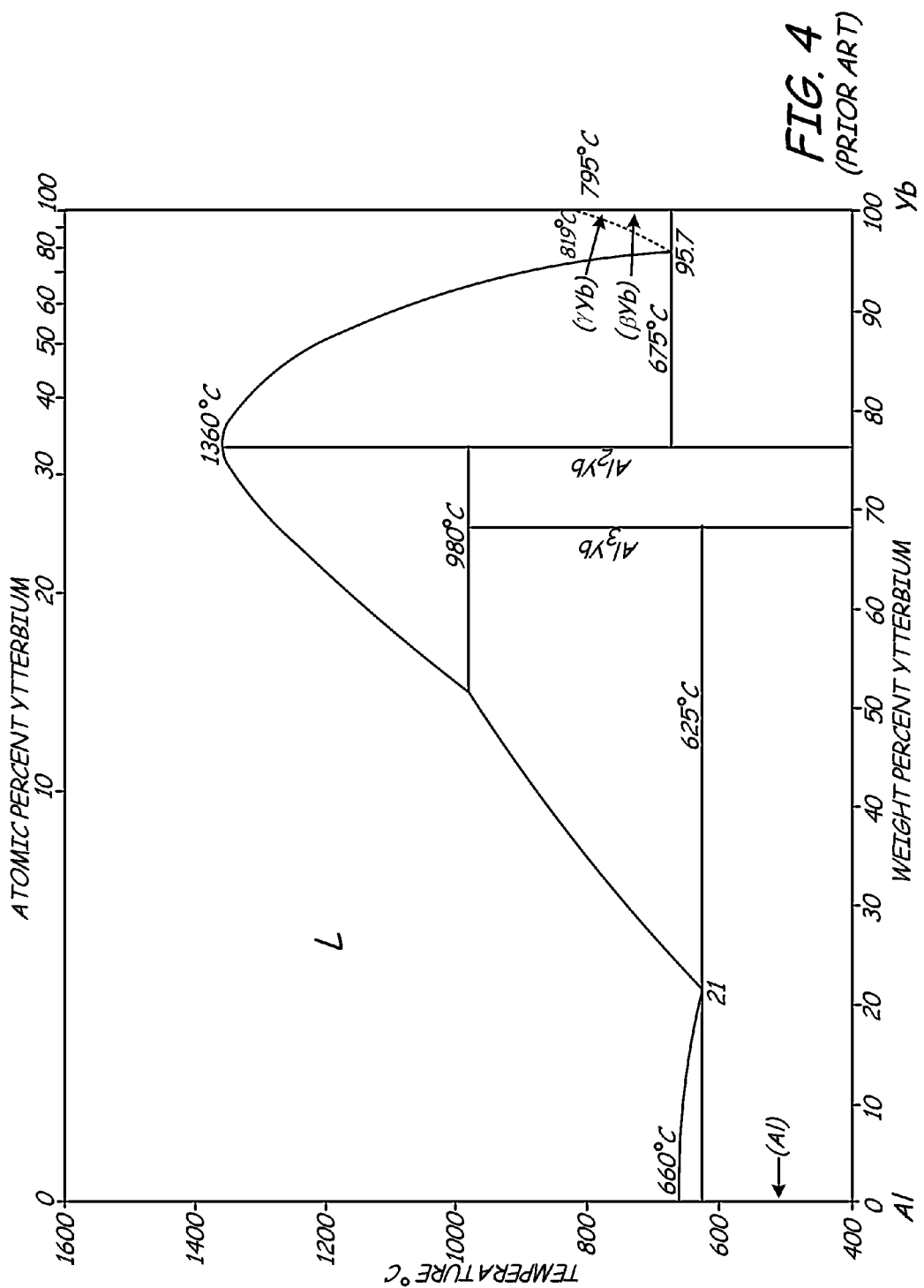
FIG. 4 is an aluminum ytterbium phase diagram.

The amount of ytterbium present in the alloys, if any, may vary from about 0.1 to about 25 weight percent, more preferably from about 0.3 to about 20 weight percent, and even more preferably from about 0.4 to about 10 weight percent. The Al—Yb phase diagram shown in FIG. 4 indicates a eutectic reaction at about 21 weight percent ytterbium at about 1157° F. (625° C.). Aluminum alloys with less than about 21 weight percent ytterbium can be quenched from the melt to retain ytterbium in solid solution that may precipitate as dispersed L1$_2$ intermetallic Al$_3$Yb following an aging treatment. Alloys with ytterbium in excess of the eutectic composition can only retain ytterbium in solid solution by rapid solidification processing (RSP) where cooling rates are in excess of about 10$^3$° C./second.

Figure 5:
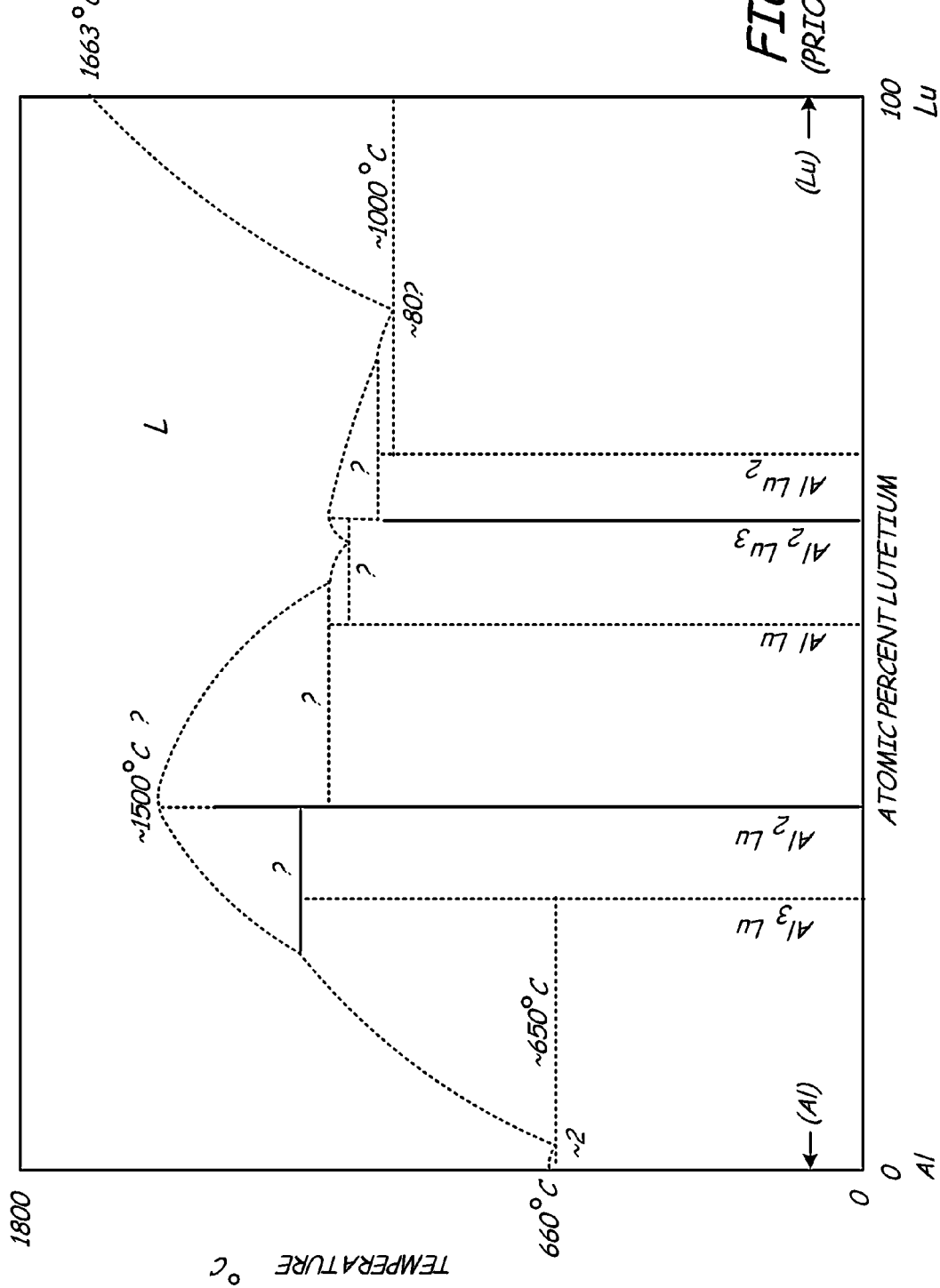
FIG. 5 is an aluminum lutetium phase diagram.

The amount of lutetium present in the alloys, if any, may vary from about 0.1 to about 25 weight percent, more preferably from about 0.3 to about 20 weight percent, and even more preferably from about 0.4 to about 10 weight percent. The Al—Lu phase diagram shown in FIG. 5 indicates a eutectic reaction at about 11.7 weight percent Lu at about 1202° F. (650° C.). Aluminum alloys with less than about 11.7 weight percent lutetium can be quenched from the melt to retain Lu in solid solution that may precipitate as dispersed L1$_2$ intermetallic Al$_3$Lu following an aging treatment. Alloys with Lu in excess of the eutectic composition can only retain Lu in solid solution by rapid solidification processing (RSP) where cooling rates are in excess of about 10$^3$° C./second.

The amount of gadolinium present in the alloys, if any, may vary from about 0.1 to about 20 weight percent, more preferably from about 0.3 to about 15 weight percent, and even more preferably from about 0.5 to about 10 weight percent.

The amount of yttrium present in the alloys, if any, may vary from about 0.1 to about 20 weight percent, more preferably from about 0.3 to about 15 weight percent, and even more preferably from about 0.5 to about 10 weight percent.

The amount of zirconium present in the alloys, if any, may vary from about 0.05 to about 4 weight percent, more preferably from about 0.1 to about 3 weight percent, and even more preferably from about 0.3 to about 2 weight percent.

The amount of titanium present in the alloys, if any, may vary from about 0.05 to about 10 weight percent, more preferably from about 0.2 to about 8 weight percent, and even more preferably from about 0.4 to about 4 weight percent.

The amount of hafnium present in the alloys, if any, may vary from about 0.05 to about 10 weight percent, more preferably from about 0.2 to about 8 weight percent, and even more preferably from about 0.4 to about 5 weight percent.

The amount of niobium present in the alloys, if any, may vary from about 0.05 to about 5 weight percent, more preferably from about 0.1 to about 3 weight percent, and even more preferably from about 0.2 to about 2 weight percent.

In order to have the best properties for the fine grain matrix, it is desirable to limit the amount of other elements. Specific elements that should be reduced or eliminated include no more than about 0.1 weight percent iron, 0.1 weight percent chromium, 0.1 weight percent vanadium, and 0.1 weight percent cobalt. The total quantity of additional elements should not exceed about 1% by weight, including the above listed impurities and other elements.

2. $L1_2$ Alloy Powder Formation and Consolidation

The highest cooling rates observed in commercially viable processes are achieved by gas atomization of molten metals to produce powder. Gas atomization is a two fluid process wherein a stream of molten metal is disintegrated by a high velocity gas stream. The end result is that the particles of molten metal eventually become spherical due to surface tension and finely solidify in powder form. Heat from the liquid droplets is transferred to the atomization gas by convection. The solidification rates, depending on the gas and the surrounding environment, can be very high and can exceed $10^{6°}$ C./second. Cooling rates greater than $10^{3°}$ C./second are typically specified to ensure supersaturation of alloying elements in gas atomized $L1_2$ aluminum alloy powder in the inventive process described herein.

Figure 6A:
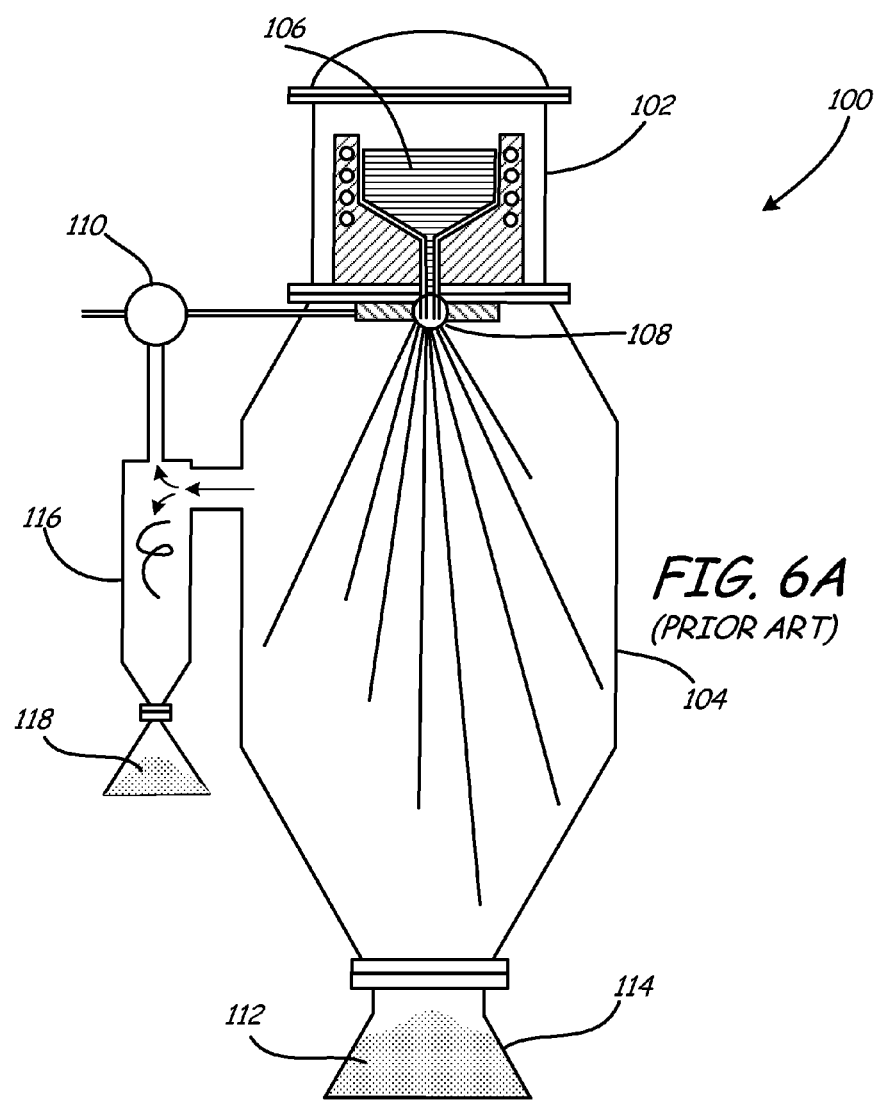
FIG. 6A is a schematic diagram of a vertical gas atomizer.
Figure 6B:
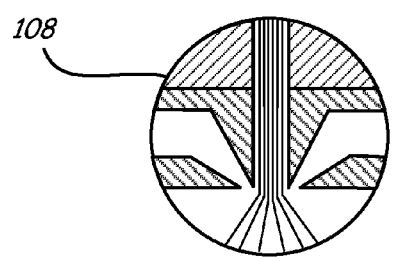
FIG. 6B is a close up view of nozzle 108 in FIG. 6A.

A schematic of typical vertical gas atomizer 100 is shown in FIG. 6A. FIG. 6A is taken from R. Germain, Powder Metallurgy Science Second Edition MPIF (1994) (chapter 3, p. 101) and is included herein for reference. Vacuum or inert gas induction melter 102 is positioned at the top of free flight chamber 104. Vacuum induction melter 102 contains melt 106 which flows by gravity or gas overpressure through nozzle 108. A close up view of nozzle 108 is shown in FIG. 6B. Melt 106 enters nozzle 108 and flows downward till it meets the high pressure gas stream from gas source 110 where it is transformed into a spray of droplets. The droplets eventually become spherical due to surface tension and rapidly solidify into spherical powder 112 which collects in collection chamber 114. The gas recirculates through cyclone collector 116 which collects fine powder 118 before returning to the input gas stream. As can be seen from FIG. 6A, the surroundings to which the melt and eventual powder are exposed are completely controlled.

There are many effective nozzle designs known in the art to produce spherical metal powder. Designs with short gas-to-melt separation distances produce finer powders. Confined nozzle designs where gas meets the molten stream at a short distance just after it leaves the atomization nozzle are preferred for the production of the inventive $L1_2$ aluminum alloy powders disclosed herein. Higher superheat temperatures cause lower melt viscosity and longer cooling times. Both result in smaller spherical particles.

A large number of processing parameters are associated with gas atomization that affect the final product. Examples include melt superheat, gas pressure, metal flow rate, gas type, and gas purity. In gas atomization, the particle size is related to the energy input to the metal. Higher gas pressures, higher superheat temperatures and lower metal flow rates result in smaller particle sizes. Higher gas pressures provide higher gas velocities for a given atomization nozzle design.

To maintain purity, inert gases are used, such as helium, argon, and nitrogen. Helium is preferred for rapid solidification because the high heat transfer coefficient of the gas leads to high quenching rates and high supersaturation of alloying elements.

Figure 7A:
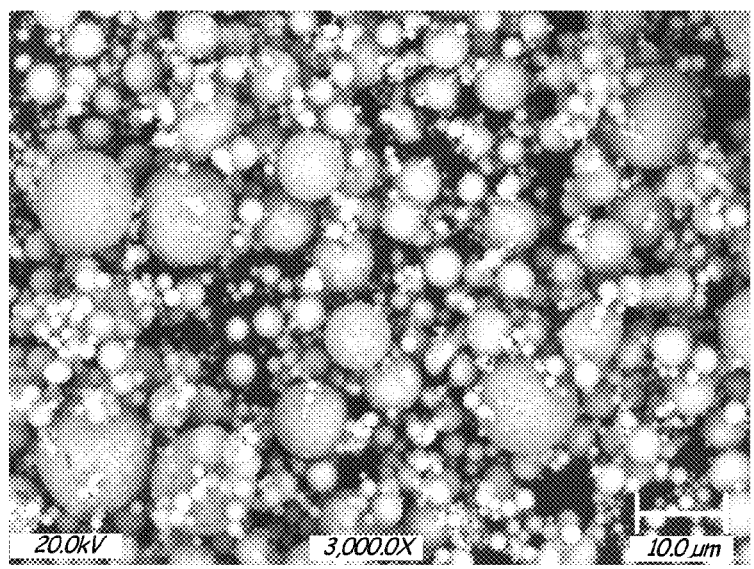
FIGS. 7A and 7B are SEM photos of the inventive aluminum alloy powder.
Figure 7B:
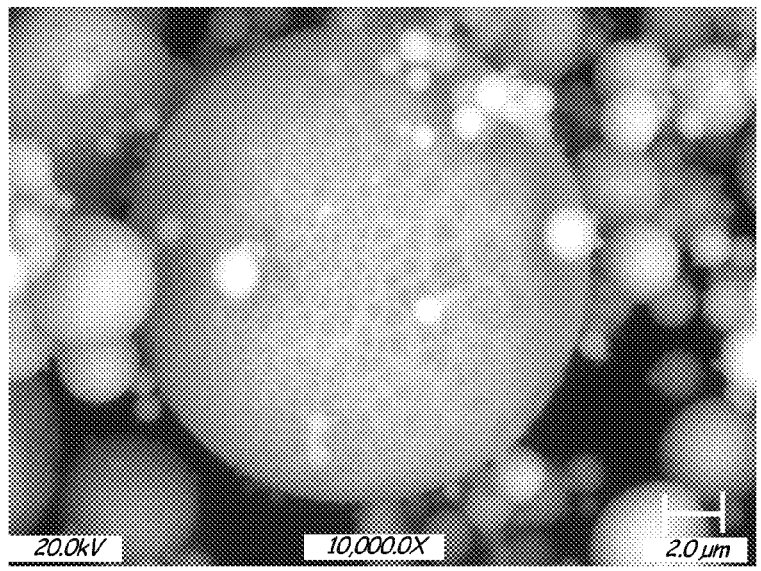
Figure 8A:
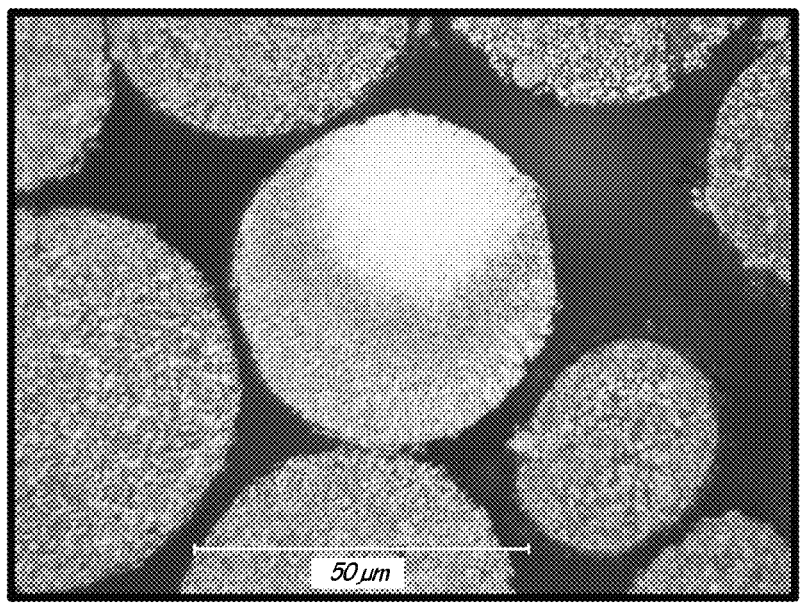
FIGS. 8A and 8B are optical micrographs showing the microstructure of gas atomized L1$_2$ aluminum alloy powder.
Figure 8B:
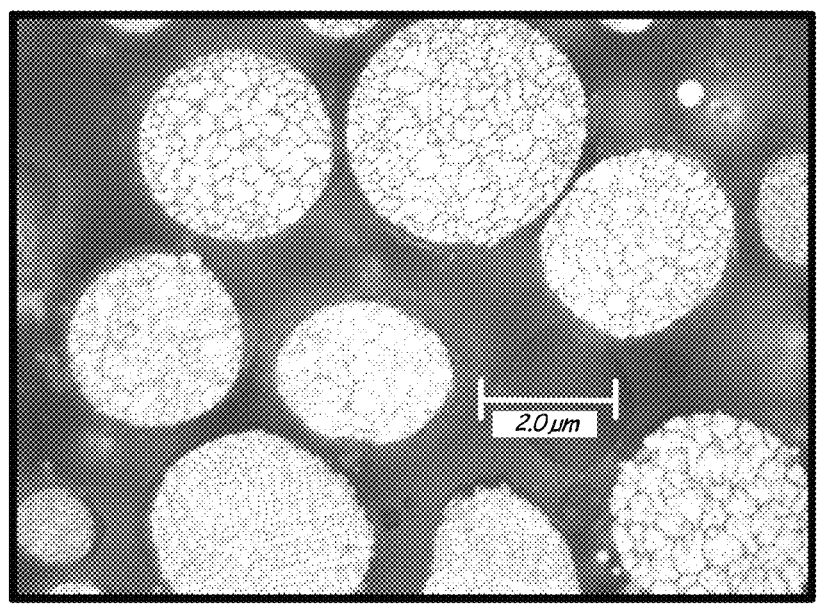

Lower metal flow rates and higher gas flow ratios favor production of finer powders. The particle size of gas atomized melts typically has a log normal distribution. In the turbulent conditions existing at the gas/metal interface during atomization, ultra fine particles can form that may reenter the gas expansion zone. These solidified fine particles can be carried into the flight path of molten larger droplets resulting in agglomeration of small satellite particles on the surfaces of larger particles. An example of small satellite particles attached to inventive spherical $L1_2$ aluminum alloy powder is shown in the scanning electron microscopy (SEM) micrographs of FIGS. 7A and 7B at two magnifications. The spherical shape of gas atomized aluminum powder is evident. The spherical shape of the powder is suggestive of clean powder without excessive oxidation. Higher oxygen in the powder results in irregular powder shape. Spherical powder helps in improving the flowability of powder which results in higher apparent density and tap density of the powder. The satellite particles can be minimized by adjusting processing parameters to reduce or even eliminate turbulence in the gas atomization process. The microstructure of gas atomized aluminum alloy powder is predominantly cellular as shown in the optical micrographs of cross-sections of the inventive alloy in FIGS. 8A and 8B at two magnifications. The rapid cooling rate suppresses dendritic solidification common at slower cooling rates resulting in a finer microstructure with minimum alloy segregation.

Oxygen and hydrogen in the powder can degrade the mechanical properties of the final part. It is preferred to limit the oxygen in the $L1_2$ alloy powder to about 1 ppm to 2000 ppm. Oxygen is intentionally introduced as a component of the helium gas during atomization. An oxide coating on the $L1_2$ aluminum powder is beneficial for two reasons. First, the coating prevents agglomeration by contact sintering and secondly, the coating inhibits the chance of explosion of the powder. A controlled amount of oxygen is important in order to provide good ductility and fracture toughness in the final consolidated material. Hydrogen content in the powder is controlled by ensuring the dew point of the helium gas is low. A dew point of about minus 50° F. (minus 45.5° C.) to minus 100° F. (minus 73.3° C.) is preferred.

In preparation for final processing, the powder is classified according to size by sieving. To prepare the powder for sieving, if the powder has zero percent oxygen content, the powder may be exposed to nitrogen gas which passivates the powder surface and prevents agglomeration. Finer powder sizes result in improved mechanical properties of the end product. While minus 325 mesh (about 45 microns) powder can be used, minus 450 mesh (about 30 microns) powder is a preferred size in order to provide good mechanical properties in the end product. During the atomization process, powder is collected in collection chambers in order to prevent oxidation of the powder. Collection chambers are used at the bottom of atomization chamber 104 as well as at the bottom of cyclone collector 116. The powder is transported and stored in the collection chambers also. Collection chambers are maintained under positive pressure with nitrogen gas which prevents oxidation of the powder.

Figure 9:
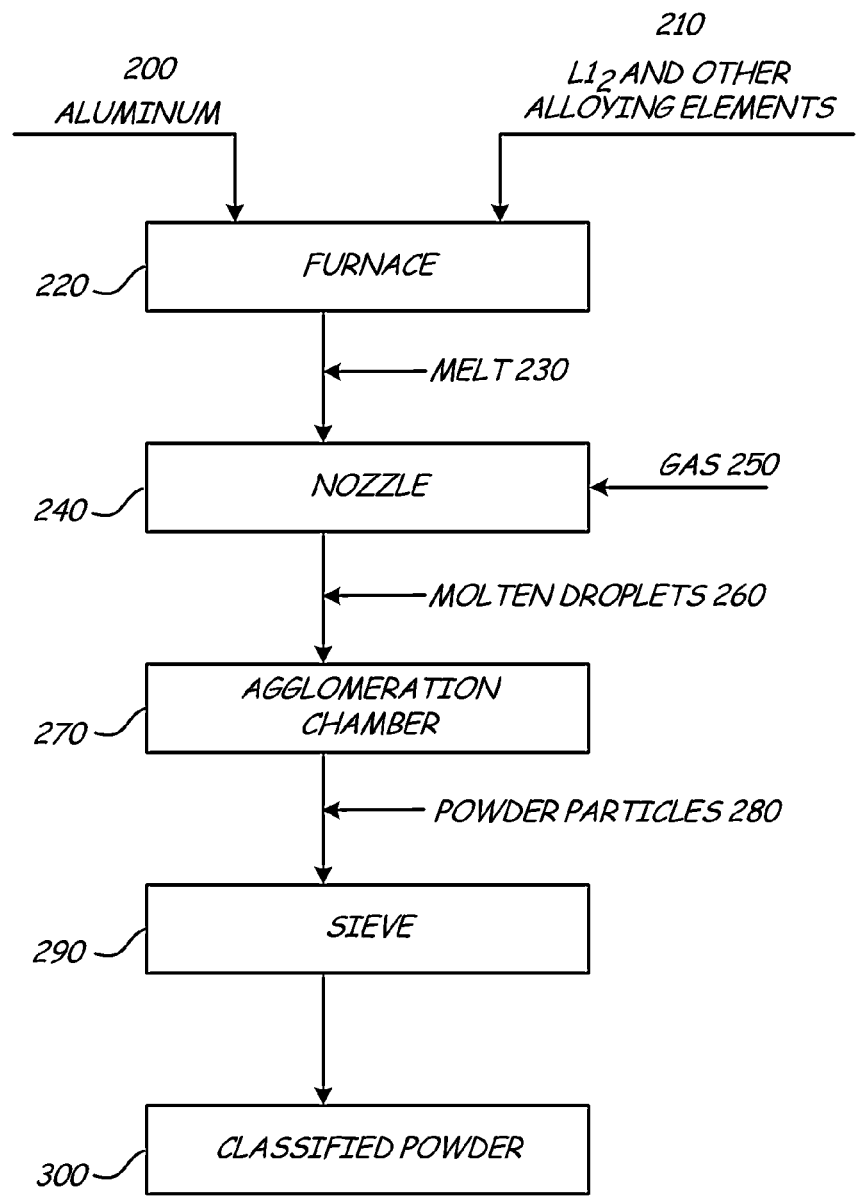
FIG. 9 is a diagram showing the steps of the gas atomization process.

A schematic of the $L1_2$ aluminum powder manufacturing process is shown in FIG. 9. In the process aluminum 200 and $L1_2$ forming (and other alloying) elements 210 are melted in furnace 220 to a predetermined superheat temperature under vacuum or inert atmosphere. Preferred charge for furnace 220 is prealloyed aluminum 200 and $L1_2$ and other alloying elements before charging furnace 220. Melt 230 is then passed through nozzle 240 where it is impacted by pressurized gas stream 250. Gas stream 250 is an inert gas such as nitrogen, argon or helium, preferably helium. Melt 230 can flow through nozzle 240 under gravity or under pressure. Gravity flow is preferred for the inventive process disclosed herein. Preferred pressures for pressurized gas stream 250 are about 50 psi (10.35 MPa) to about 750 psi (5.17 MPa) depending on the alloy.

The atomization process creates molten droplets 260 which rapidly solidify as they travel through agglomeration chamber 270 forming spherical powder particles 280. The molten droplets transfer heat to the atomizing gas by convention. The role of the atomizing gas is two fold: one is to disintegrate the molten metal stream into fine droplets by transferring kinetic energy from the gas to the melt stream and the other is to extract heat from the molten droplets to rapidly solidify them into spherical powder. The solidification time and cooling rate vary with droplet size. Larger droplets take longer to solidify and their resulting cooling rate is lower. On the other hand, the atomizing gas will extract heat efficiently from smaller droplets resulting in a higher cooling rate. Finer powder size is therefore preferred as higher cooling rates provide finer microstructures and higher mechanical properties in the end product. Higher cooling rates lead to finer cellular microstructures which are preferred for higher mechanical properties. Finer cellular microstructures result in finer grain sizes in consolidated product. Finer grain size provides higher yield strength of the material through the Hall-Petch strengthening model.

Key process variables for gas atomization include superheat temperature, nozzle diameter, helium content and dew point of the gas, and metal flow rate. Superheat temperatures of from about 150° F. (66° C.) to 200° F. (93° C.) are preferred. Nozzle diameters of about 0.07 in. (1.8 mm) to 0.12 in. (3.0 mm) are preferred depending on the alloy. The gas stream used herein was a helium nitrogen mixture containing 74 to 87 vol. % helium. The metal flow rate ranged from about 0.8 lb/min (0.36 kg/min) to 4.0 lb/min (1.81 kg/min). The oxygen content of the $L1_2$ aluminum alloy powders was observed to consistently decrease as a run progressed. This is suggested to be the result of the oxygen gettering capability of the aluminum powder in a closed system. The dew point of the gas was controlled to minimize hydrogen content of the powder. Dew points in the gases used in the examples ranged from −10° F. (−23° C.) to −110° F. (−79° C.).

The powder is then classified by sieving process 290 to create classified powder 300. Sieving of powder is performed under an inert environment to minimize oxygen and hydrogen pickup from the environment. While the yield of minus 450 mesh powder is extremely high (95%), there are always larger particle sizes, flakes and ligaments that are removed by the sieving. Sieving also ensures a narrow size distribution and provides a more uniform powder size. Sieving also ensures that flaw sizes cannot be greater than minus 450 mesh which will be required for nondestructive inspection of the final product.

Processing parameters of exemplary gas atomization runs are listed in Table 1.

TABLE 1

Gas atomization parameters used for producing powder

| Run | Nozzle Diameter (in) | He Content (vol %) | Gas Pressure (psi) | Dew Point (° F.) | Charge Temperature (° F.) | Average Metal Flow Rate (lbs/min) | Oxygen Content (ppm) Start | Oxygen Content (ppm) End |
|---|---|---|---|---|---|---|---|---|
| 1 | 0.10 | 79 | 190 | <−58 | 2200 | 2.8 | 340 | 35 |
| 2 | 0.10 | 83 | 192 | −35 | 1635 | 0.8 | 772 | 27 |
| 3 | 0.09 | 78 | 190 | −10 | 2230 | 1.4 | 297 | <0.01 |
| 4 | 0.09 | 85 | 160 | −38 | 1845 | 2.2 | 22 | 4.1 |
| 5 | 0.10 | 86 | 207 | −88 | 1885 | 3.3 | 286 | 208 |
| 6 | 0.09 | 86 | 207 | −92 | 1915 | 2.6 | 145 | 88 |

The role of powder quality is extremely important to produce material with higher strength and ductility. Powder quality is determined by powder size, shape, size distribution, oxygen content, hydrogen content, and alloy chemistry. Over fifty gas atomization runs were performed to produce the inventive powder with finer powder size, finer size distribution, spherical shape, and lower oxygen and hydrogen contents. Processing parameters of some exemplary gas atomization runs are listed in Table 1. It is suggested that the observed decrease in oxygen content is attributed to oxygen gettering by the powder as the runs progressed.

Inventive $L1_2$ aluminum alloy powder was produced with over 95% yield of minus 450 mesh (30 microns) which includes powder from about 1 micron to about 30 microns. The average powder size was about 10 microns to about 15 microns. As noted above, finer powder size is preferred for higher mechanical properties. Finer powders have finer cellular microstructures. As a result, finer cell sizes lead to finer grain size by fragmentation and coalescence of cells during powder consolidation. Finer grain sizes produce higher yield strength through the Hall-Petch strengthening model where yield strength varies inversely as the square root of the grain size. It is preferred to use powder with an average particle size of 10-15 microns. Powders with a powder size less than 10-15 microns can be more challenging to handle due to the larger surface area of the powder. Powders with sizes larger than 10-15 microns will result in larger cell sizes in the consolidated product which, in turn, will lead to larger grain sizes and lower yield strengths.

Powders with narrow size distributions are preferred. Narrower powder size distributings produce product microstructures with more uniform grain size. Spherical powder was produced to provide higher apparent and tap densities which help in achieving 100% density in the consolidated product. Spherical shape is also an indication of cleaner and lower oxygen content powder. Lower oxygen and lower hydrogen contents are important in producing material with high ductility and fracture toughness. Although it is beneficial to maintain low oxygen and hydrogen content in powder to achieve good mechanical properties, lower oxygen may interfere with sieving due to self sintering. An oxygen content of about 25 ppm to about 500 ppm is preferred to provide good ductility and fracture toughness without any sieving issue. Lower hydrogen is also preferred for improving ductility and fracture toughness. It is preferred to have about 25-200 ppm of hydrogen in atomized powder by controlling the dew point in the atomization chamber. Hydrogen in the powder is further reduced by heating the powder in vacuum. Lower hydrogen in final product is preferred to achieve good ductility and fracture toughness.

Figure 10:
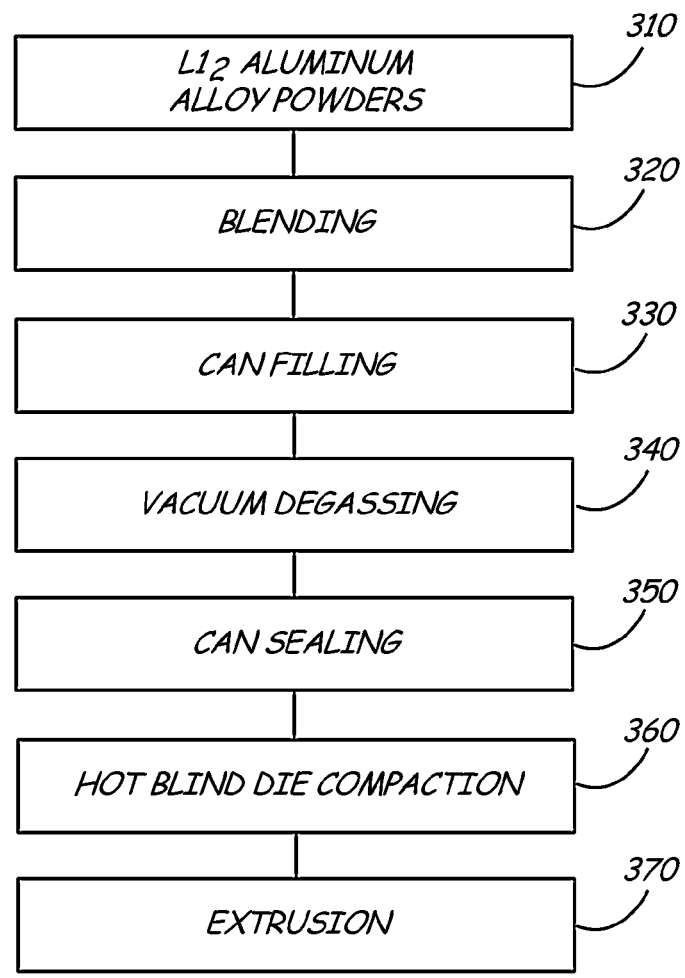
FIG. 10 is a diagram showing the processing steps to consolidate the L1$_2$ aluminum alloy powder.

A schematic of the $L1_2$ aluminum powder consolidation process is shown in FIG. 10. The starting material is sieved and classified $L1_2$ aluminum alloy powders (step 310). Blending (step 320) is a preferred step in the consolidation process because it results in improved uniformity of particle size distribution. Gas atomized $L1_2$ aluminum alloy powder generally exhibits a bimodal particle size distribution and cross blending of separate powder batches tends to homogenize the particle size distribution. Blending (step 320) is also preferred when separate metal and/or ceramic powders are added to the $L1_2$ base powder to form bimodal or trimodal consolidated alloy microstructures.

Following blending (step 320), the powders are transferred to a can (step 330) where the powder is vacuum degassed (step 340) at elevated temperatures. The can (step 330) is an aluminum container having a cylindrical, rectangular or other configuration with a central axis. Cylindrical configurations are preferred with hydraulic extrusion presses. Vacuum degassing times can range from about 0.5 hours to about 8 days. A temperature range of about 300° F. (149° C.) to about 900° F. (482° C.) is preferred. Dynamic degassing of large amounts of powder is preferred to static degassing. In dynamic degassing, the can is preferably rotated during degassing to expose all of the powder to a uniform temperature. Degassing removes oxygen and hydrogen from the powder.

Following vacuum degassing (step 340), the vacuum line is crimped and welded shut (step 350). The powder is then fully densified by blind die compaction or closed die forging as the process is sometimes called (step 360). At this point the can may be removed by machining (step 380) to form a useful billet (step 390).

Figure 11A:
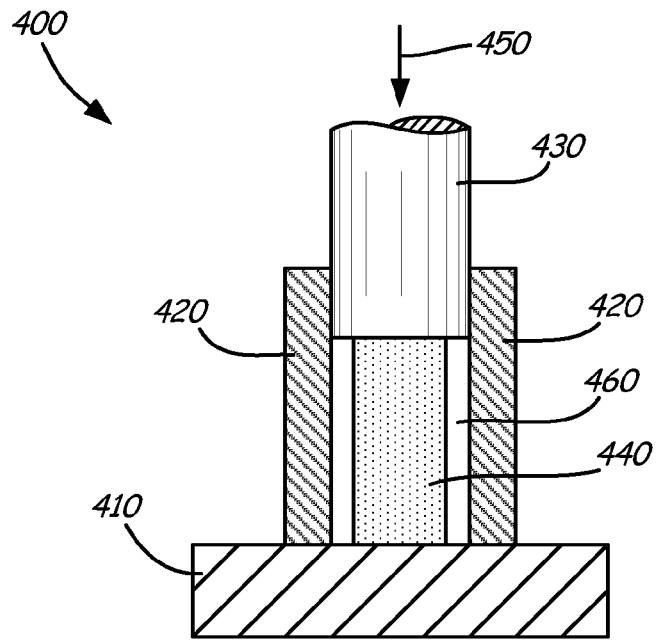
FIG. 11 is a schematic diagram of blind die compaction.
Figure 11B:
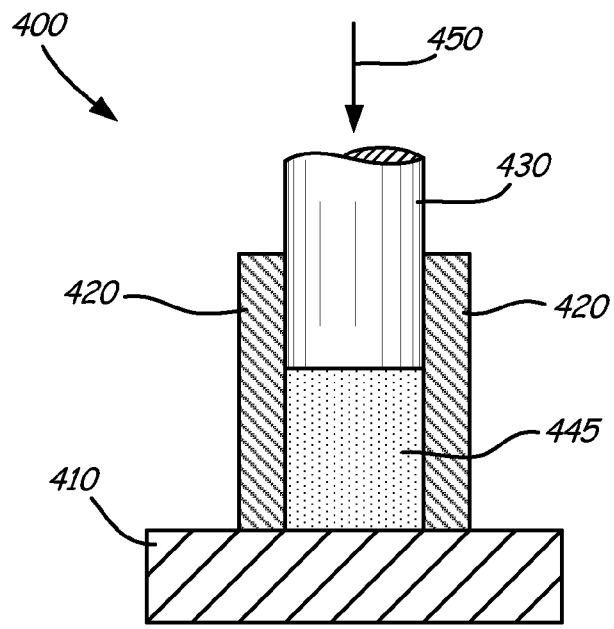

A schematic showing blind die compaction (process 400) is shown in FIGS. 11A and 11B. The equipment comprises base 410, die 420, ram 430, and means to apply pressure to ram 430 indicated by arrow 450. Prior to compaction, billet 440 does not fill die cavity 460. After compaction, billet 445 completely fills the die cavity and has taken the shape of die cavity 460. The die cavities can have any shape provided they have a central symmetrical axis parallel to arrow 450. Rectangular shapes adopt well for rolling preforms. Canned $L1_2$ aluminum alloy powder preforms are easily densified due to the large capacity of modern hydraulic presses.

3. $L1_2$ Aluminum Alloy Container Fabrication $L1_2$ aluminum alloys are ideal lightweight candidates for application as containers in an aerospace environment where temperatures approach 600° F. (316° C.). The high specific strength of these alloys qualifies them to be used as lightweight high pressure containers such as fuel or hydraulic tanks. Fabrication of one exemplary embodiment of the invention, a cylinder with a hemispherical top, will be described here as an example. It is to be understood that the inventive $L1_2$ alloys can be used for an unlimited number of container applications, particularly in the aerospace environment.

Figure 12:
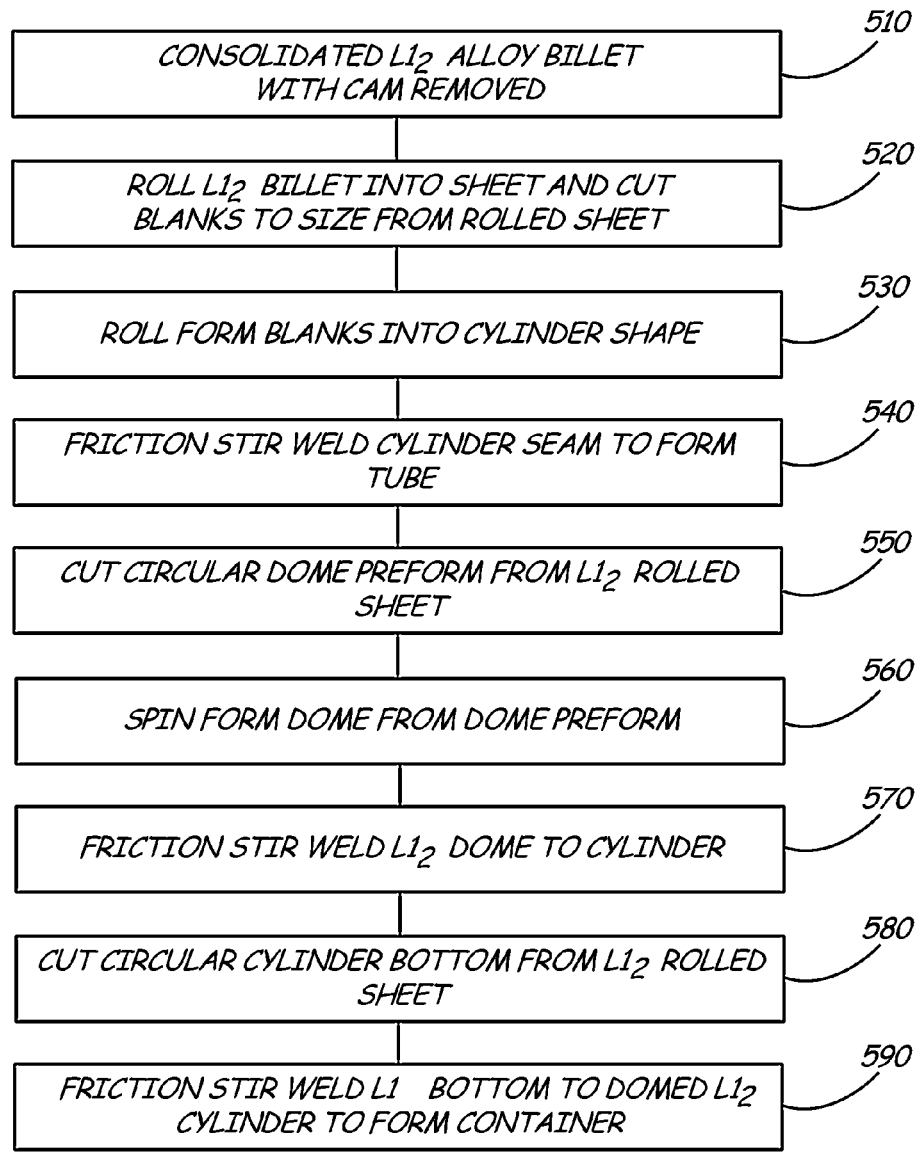
FIG. 12 is a flow diagram of a method of forming an L1$_2$ aluminum alloy tank.
Figure 13:
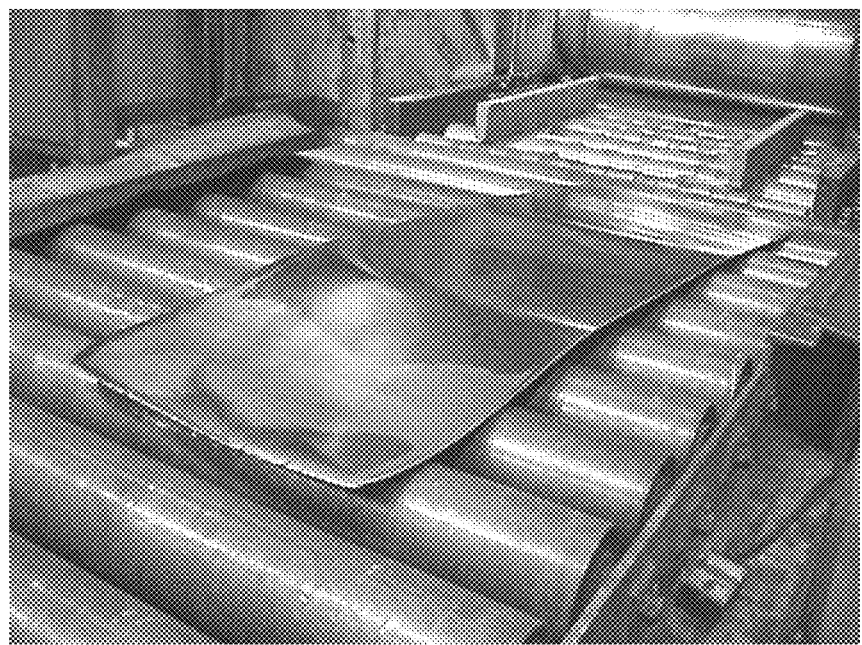
FIG. 13 is a photo of rolled L1$_2$ aluminum alloy sheet.
Figure 14:
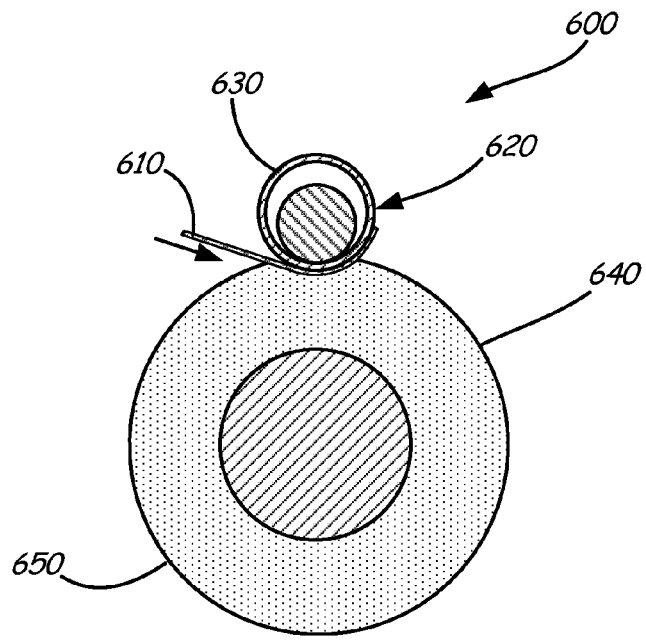
FIG. 14 is a schematic of a roll bending operation.

A flow diagram listing the steps to fabricate an $L1_2$ aluminum alloy cylinder with a hemispherical top is given in FIG. 12. The process starts with a consolidated $L1_2$ alloyed billet with the can removed (Step 510). The billet is then rolled into a thin sheet (Step 520). Rolling at ambient temperature with intermediate stress relief anneals between passes is preferred. A photograph of a rolled $L1_2$ aluminum alloy sheet is shown in FIG. 13. The sheet has an excellent surface finish. Rectangular blanks are then cut from the sheet that will form the cylindrical wall of the container (Step 520). The rectangular blanks are then roll formed into a cylindrical shape. There are many ways to roll form an alloy sheet into cylindrical shapes known in the art. One method is schematically illustrated in FIG. 14. Roll forming process 600 comprises rolled $L1_2$ alloy sheet 610 passing between removable mandrel 630 and urethane roll 640 mounted on drive shaft 650. Top steel roll 620 is programmed to apply downward pressure to force mandrel 630 and alloy sheet 610 into urethane roll 640 as it is driven in the direction of arrow 650. This allows alloy sheet 610 to assume the curvature of mandrel 630 thereby forming a cylindrical shape.

Figure 15:
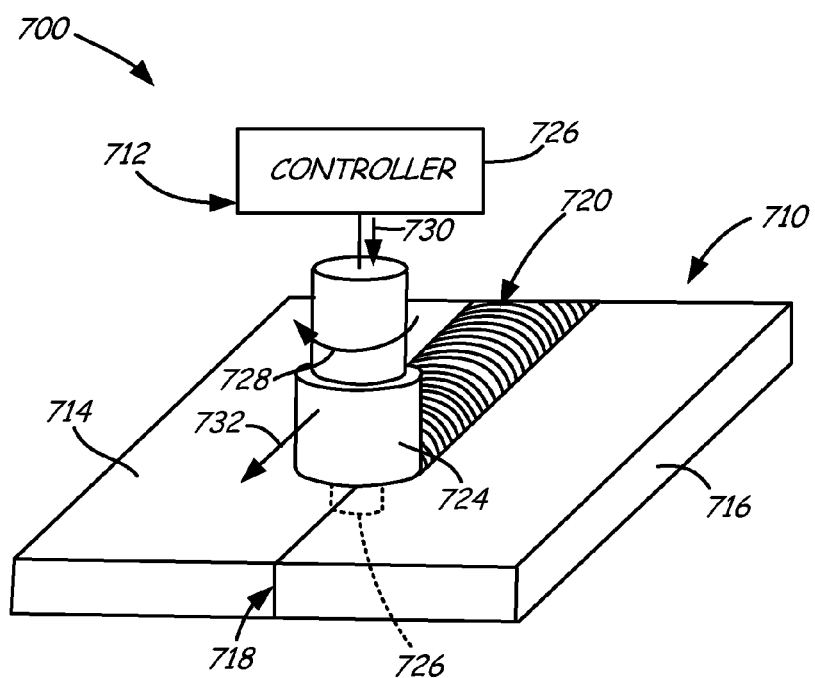
FIG. 15 is a perspective view of a friction stir welding operation.

Roll formed cylindrical alloy sheet 610 is then friction stir welded to form a cylinder (Step 540). FIG. 15 is a perspective sketch of friction stir welding operation 700. Friction stir welding (FSW) operation 700 comprises welded structure 710 and FSW system 712. Welded structure 710 comprises $L1_2$ alloy sheets 714 and 716 that abut each other at intersection 718. In this invention, alloy sheets 714 and 716 are each end of roll formed cylinder 610. As discussed below, alloy sheet 714 and 716 are welded together at intersection 718 with FSW system 712 to form welded joint 720 where joint 720 substantially retains the pre-weld strengths of alloy sheets 714 and 716.

FSW system 712 includes controller 722, tool 724, and pin 726 (pin 726 shown with hidden lines). Pin 726 extends from the bottom surface of tool 724 and is pressed into metal parts 714 and 716 during a FSW operation. Controller 722 directs tool 724 and pin 726 to rotate in the direction of arrow 728 (or in an opposite rotational direction from arrow 728), and to press down into metal parts 714 and 716 in the direction of arrow 730. This causes pin 726 to dig into alloy sheets 714 and 716 at intersection 718 until tool 724 reaches alloy sheets 714 and 716. The depth of pin 726 determines the depth of the weld at intersection 718.

While tool 724 and pin 726 are rotating, controller 722 directs tool 724 and pin 726 to move along intersection 718 in the direction of arrow 732. As tool 724 and pin 726 move along intersection 718, the rotation of tool 724 and pin 726 frictionally heat alloy sheets 714 and 716 at intersection 718. The heated alloys enter a plastic-like state, and are stirred by the rotational motion of tool 724 and pin 726, thereby creating welded joint 720 at intersection 718. Alloy sheets 714 and 716 are desirably braced together to prevent alloy sheets 714 and 716 from moving apart during the FSW operation. Process variables include tool material, downward force, tool rotational speed, and traverse rate. The FSW operation is a solid-state welding process, in which the heated alloys do not melt. As such, the refined microstructures of the $L1_2$ aluminum alloys are substantially retained while forming welded joint 720. This is in contrast to other welding techniques, such as fusion welding, in which the welded alloys are melted to form a welded joint. Melting $L1_2$ aluminum alloys destroys the refined $L1_2$ microstructure of the alloys, thereby lowering the strength and deformation resistance of the resulting welded structure.

Figure 16:
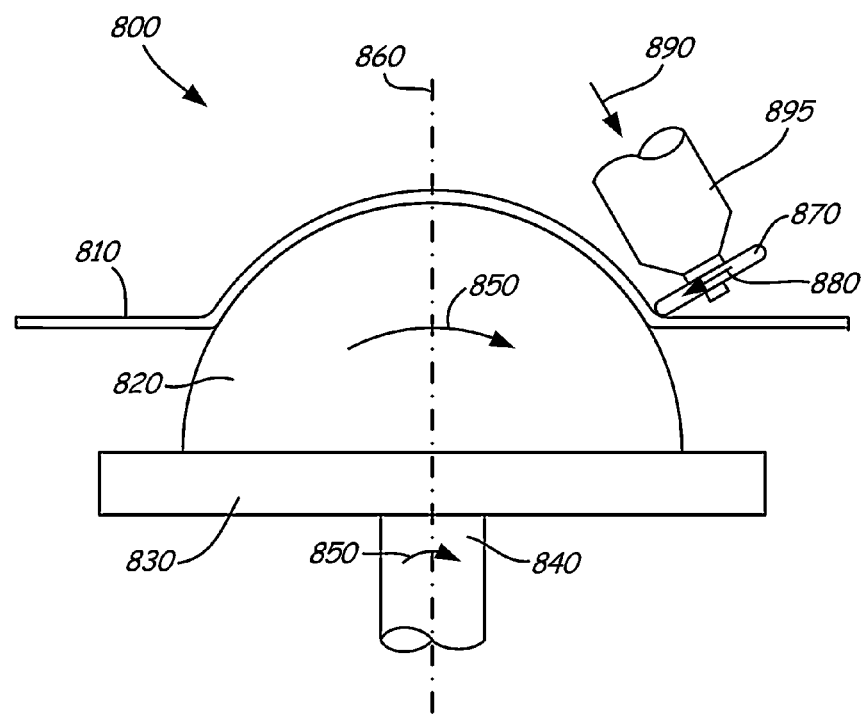
FIG. 16 is a schematic of a spin forming operation.

The next step is to cut a circular preform from the $L1_2$ alloy rolled sheet as a starting piece to form a dome (Step 550). The dome is then formed by a number of sheet metal forming processes known in the art. The example discussed herein is spin forming (Step 560). FIG. 16 is a schematic illustration of spin forming operation 800. Spin forming operation 800 comprises $L1_2$ alloy sheet 810 on hemispherical dome pattern 820 on rotatable table 830 on rotatable shaft 840 rotating in direction of arrows 850 around axis 860.

Spin forming tool 865 comprises tool holder 875 and tool 870. Tool 870 comprises a rotatable wheel rotating in the direction of arrow 880. During spin forming, tool 865 is moved in the direction of arrow 890 such that tool 870 forces alloy sheet 810 to conform to the external shape of hemispherical dome pattern 820 thereby spin forming a dome.

The next step in fabricating an $L1_2$ alloy container comprising a cylindrical body with a hemispherical dome top is to friction stir weld the spin formed dome to the roll formed and friction stir welded cylinder (Step 570). Finally, a closed container can be formed by cutting a circular bottom for the cylinder from $L1_2$ alloy rolled sheet (Step 580) and friction stir welding it to the domed $L1_2$ alloy cylinder.

Figures 17, 18:
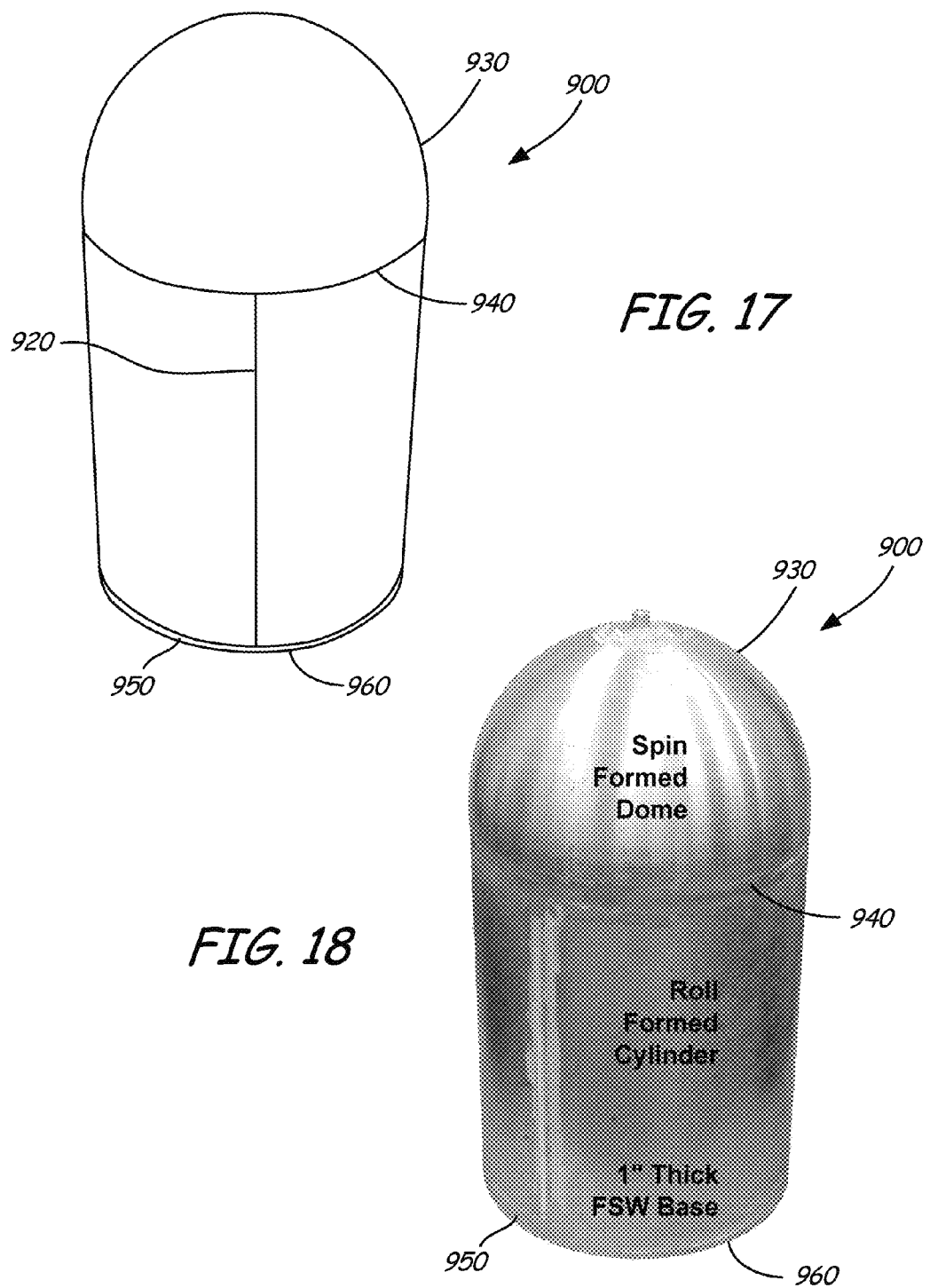
FIG. 17 is a sketch of a cylindrical $L1_2$ aluminum alloy tank with a hemispherical top and a flat bottom.
FIG. 18 is a photograph of a cylindrical $L1_2$ aluminum alloy tank with a hemispherical top and a flat bottom.

A perspective sketch of the inventive $L1_2$ aluminum alloy container is shown in FIG. 17. Roll formed $L1_2$ alloy cylindrical body 910 is topped with spin formed hemispherical dome 930. Friction stir weld 920 forms cylindrical body 910 and friction stir weld 940 attaches $L1_2$ alloy dome 930 to cylindrical body 910. Bottom 950 is attached to cylindrical body 910 by friction stir weld 960. A photograph of a friction stir welded $L1_2$ roll formed cylinder with a spin formed dome is shown in FIG. 18 with the components identified by the same numbers as in FIG. 17.

Although the present invention has been described with reference to preferred embodiments, workers skilled in the art will recognize that changes may be made in form and detail without departing from the spirit and scope of the invention.

The invention claimed is:

1. A method for forming an aluminum alloy tank containing $L1_2$ dispersoids, comprising the steps of:
    placing in an aluminum can a quantity of an aluminum alloy powder containing an $L1_2$ dispersoid comprising $Al_3X$ dispersoids wherein X is at least one first element selected from the group consisting of:
    about 0.1 to about 4.0 weight percent scandium, about 0.1 to about 20.0 weight percent erbium, about 0.1 to about 15.0 weight percent thulium, about 0.1 to about 25.0 weight percent ytterbium, and about 0.1 to about 25.0 weight percent lutetium;
    at least one second element selected from the group consisting of: about 0.1 to about 20.0 weight percent gadolinium, about 0.1 to about 20.0 weight percent yttrium, about 0.05 to about 4.0 weight percent zirconium, about 0.05 to about 10.0 weight percent titanium, about 0.05 to about 10.0 weight percent hafnium, and about 0.05 to about 5.0 weight percent niobium; and
    the balance aluminum;
    vacuum degassing the powder at a temperature of about 300° F. (149° C.) to about 900° F. (482° C.) for about 0.5 hours to about 8 days;
    sealing the degassed powder in the can under vacuum;
    heating the sealed can at about 300° F. (149° C.) to about 900° F. (482° C.) for about 15 minutes to eight hours;
    vacuum hot pressing the heated can to form a billet;
    removing the can from the formed billet;
    rolling the formed billet into a sheet;
    forming a body of the tank by cutting a blank from the sheet;
    roll forming the blank into a hollow structural shape with an open seam;
    welding the seam to form a tank body with an outside perimeter shape;
    forming a top of the tank by cutting a preform from the rolled sheet;
    forming the preform into a tank top with the same outside perimeter shape as the tank body;
    welding the tank top to the tank body;
    forming a bottom of the tank by cutting a bottom blank from the rolled sheet with the same outside perimeter shape as the tank body; and
    welding the bottom blank to the tank body to form a closed tank.

2. The method of claim 1, wherein the aluminum alloy powder contains at least one element selected from the group consisting of silicon, magnesium, manganese, lithium, copper, zinc, and nickel.

3. The method of claim 1, wherein the aluminum alloy powder contains at least one ceramic selected from the group consisting of about 5 to about 40 volume percent aluminum oxide, about 5 to about 40 volume percent silicon carbide, about 5 to about 40 volume percent aluminum nitrite, about 5 to about 40 volume percent titanium diborite, about 5 to about 40 volume percent titanium boride, about 5 to about 40 volume percent boron carbide, and about 5 to about 40 volume percent titanium carbide.

4. The method of claim 1, wherein the aluminum alloy powder has a particle size of less than 350 mesh.

5. The method of claim 1, wherein the tank has a shape selected from the group consisting of cylinders, oval containers, square containers and rectangular containers.

6. The method of claim 5, wherein the cylindrical tank is formed from a rectangular blank sheet rolled into a cylindrical shape, and welded to form the tank body, a perform is cut into a circular shape from the blank sheet to be formed into a dome top that fits on the top of the tank body, and a bottom blank is cut into a circular shape from the blank sheet to form a bottom of the tank that fits on the bottom of the tank body wherein the dome top, tank body, and tank bottom are welded together along their matching outside perimeters to form the finished tank.

7. The method of claim 1, wherein forming the dome comprises spin forming.

8. The method of claim 1, wherein welding comprises friction stir welding.

* * * * *